US008880588B2

United States Patent
Prasad

(10) Patent No.: US 8,880,588 B2
(45) Date of Patent: Nov. 4, 2014

(54) TECHNIQUE FOR STATELESS DISTRIBUTED PARALLEL CRAWLING OF INTERACTIVE CLIENT-SERVER APPLICATIONS

(75) Inventor: Mukul Ranjan Prasad, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 727 days.

(21) Appl. No.: 12/957,381

(22) Filed: Nov. 30, 2010

(65) Prior Publication Data
US 2012/0110063 A1    May 3, 2012

Related U.S. Application Data

(60) Provisional application No. 61/408,191, filed on Oct. 29, 2010.

(51) Int. Cl.
| | |
|---|---|
| G06F 15/16 | (2006.01) |
| G06F 11/36 | (2006.01) |
| G06F 9/50 | (2006.01) |
| G06Q 10/06 | (2012.01) |

(52) U.S. Cl.
CPC ............... *G06Q 10/06* (2013.01); *G06F 11/36* (2013.01); *G06F 2209/5017* (2013.01); *G06F 9/5027* (2013.01); *G06F 11/3636* (2013.01)
USPC ........... 709/203; 709/201; 709/217; 709/223; 709/224

(58) Field of Classification Search
USPC ......................... 709/203, 201, 217, 223, 224
See application file for complete search history.

(56) References Cited

U.S. PATENT DOCUMENTS

| | | | |
|---|---|---|---|
| 6,182,085 B1 | 1/2001 | Eichstaedt et al. | 707/104 |
| 6,263,364 B1 | 7/2001 | Najork et al. | 709/217 |
| 7,496,581 B2 | 2/2009 | Nomiyama et al. | 707/100 |
| 7,590,620 B1 | 9/2009 | Pike et al. | 707/3 |

(Continued)

FOREIGN PATENT DOCUMENTS

| | | | |
|---|---|---|---|
| CN | 100353733 | 12/2007 | G06F 17/30 |
| CN | 101344881 | 1/2009 | G06F 17/30 |
| CN | 101443751 | 5/2009 | G06F 15/76 |
| WO | WO 2005/077118 | 8/2005 | |

OTHER PUBLICATIONS

U.S. Appl. No. 12/7237,568; pp. 43, Mar. 12, 2010.

(Continued)

*Primary Examiner* — Bunjob A. Jaroenchonwanit
*Assistant Examiner* — Lan-Dai T Truong
(74) *Attorney, Agent, or Firm* — Baker Botts L.L.P.

(57) ABSTRACT

A distributed computing system includes worker nodes and a master node including a processor coupled to a memory. Each worker node crawls a portion of an interactive client-server application. The memory includes a master state graph, including the results of crawling. The master node is configured to examine the master state graph to determine a number of reconverging traces, receive a result from a job from a worker node if the number of reconverging traces is below a threshold, and add the result to the master state graph without attempting to remove duplicate states or transitions. A trace includes states and transitions representing valid. A reconvergent trace includes a trace including a reconvergent state, which is a state that can be reached through two or more distinct traces. The result containing states and transitions is associated with crawling a first portion of the interactive client-server application.

12 Claims, 13 Drawing Sheets

(56) References Cited

U.S. PATENT DOCUMENTS

| | | | |
|---|---|---|---|
| 7,634,496 B1 | 12/2009 | Evans | 707/102 |
| 7,636,717 B1 | 12/2009 | Gupta et al. | 707/6 |
| 7,761,395 B2 | 7/2010 | Wookey | 706/45 |
| 7,860,849 B1 | 12/2010 | Venkatachary et al. | 707/705 |
| 8,392,890 B2 | 3/2013 | Miller | 717/127 |
| 2004/0103394 A1 | 5/2004 | Manda et al. | 717/126 |
| 2004/0162874 A1 | 8/2004 | Woo et al. | 709/203 |
| 2006/0206547 A1 | 9/2006 | Kulkarni et al. | 707/205 |
| 2006/0230011 A1 | 10/2006 | Tuttle et al. | 706/62 |
| 2007/0022480 A1 | 1/2007 | Mewman | 726/24 |
| 2007/0061877 A1 | 3/2007 | Sima et al. | 762/12 |
| 2007/0083808 A1 | 4/2007 | Setlur et al. | 715/513 |
| 2007/0100967 A1 | 5/2007 | Smith et al. | 709/219 |
| 2007/0168832 A1 | 7/2007 | Richardson et al. | 714/758 |
| 2007/0240225 A1 | 10/2007 | Shrader et al. | 726/25 |
| 2008/0010361 A1* | 1/2008 | Jacobs et al. | 709/218 |
| 2008/0098375 A1 | 4/2008 | Isard | 717/149 |
| 2009/0007074 A1 | 1/2009 | Campion et al. | 717/124 |
| 2009/0225082 A1 | 9/2009 | Hargrove et al. | 345/440 |
| 2010/0088668 A1 | 4/2010 | Yoshihama et al. | 717/105 |
| 2010/0175049 A1 | 7/2010 | Ramsey et al. | 717/115 |
| 2011/0078556 A1 | 3/2011 | Prasad et al. | 715/234 |
| 2011/0078663 A1 | 3/2011 | Huang et al. | 717/126 |
| 2011/0099491 A1 | 4/2011 | Abraham et al. | 715/764 |
| 2011/0191676 A1 | 8/2011 | Guttman et al. | 715/716 |
| 2011/0270853 A1 | 11/2011 | Curbera et al. | 707/755 |
| 2013/0066848 A1 | 3/2013 | Tuttle et al. | 707/711 |

OTHER PUBLICATIONS

United States Office Action, U.S. Appl. No. 12/7237,568; pp. 19, Mar. 16, 2012.
United States Finall Office Action, U.S. Appl. No. 12/7237,568; pp. 23, Jul. 6, 2012.
U.S. Appl. No. 12/957,374; pp. 59, Nov. 30, 2010.
United States Office Action, U.S. Appl. No. 12/957,374; pp. 14, Mar. 29, 2012.
U.S. Appl. No. 12/957,376; pp. 63, Nov. 30, 2010.
United States Office Action, U.S. Appl. No. 12/957,376; pp. 14, Mar. 5, 2012.
U.S. Appl. No. 12/957,377; pp. 65, Nov. 30, 2010.
United States Office Action, U.S. Appl. No. 12/957,377; pp. 39, Mar. 14, 2012.
United States Final Office Action, U.S. Appl. No. 12/957,377; pp. 38, Aug. 13, 2012.
U.S. Appl. No. 12/957,379; pp. 68, Nov. 30, 2010.
United States Office Action, U.S. Appl. No. 12/957,379; pp. 28, Sep. 13, 2012.
U.S. Appl. No. 12/957,384; pp. 61, Nov. 30, 2010.
United States Office Action, U.S. Appl. No. 12/957,384; pp. 26, May 18, 2012.
U.S. Appl. No. 13/026,899; pp. 56, Feb. 14, 2011.
U.S. Appl. No. 13/248,027; pp. 53, Sep. 28, 2011.
U.S. Appl. No. 13/441,402; pp. 37, Apr. 6, 2012.
Mesbah et al.; "Invariant-Based Automatic Testing of AJAX User Interfaces"; SERG; pp. 1-11, 2009.
Roest et al.; Regression Testing Ajax Applications: Coping with Dynamism; SERG; pp. 1-10, 2009.
Halle et al.; "Eliminating Navigation Errors inWeb Applications via Model Checking and Runtime Enforcement of Navigation State Machines"; ACM; pp. 235-244, 2010.
Chau et al.; "Parallel Crawling for Online Social Networks"; ACM; pp. 1283-1284, 2007.
Hafri et al.; "Dominos: A New Web Crawler's Design"; IWAW04; pp. 8, 2004.
Mesbah et al.; "Crawling AJAX by Inferring User Interface State Changes"; Software Engineering Research Group; pp. 16, 2008.
Cho et al.; "Parallel Crawlers"; ACM; pp. 13, 2002.
Mesbah, Ali et al., "Automated Cross-Browser Compatibility Testing" International Conference on Software Engineering (ICSE 2011), 2011.
Choudhary, Shauvik Roy, et al., "WebDiff: Automated Identification of Cross-browser Issues in Web Applications", International Conference on Software Maintenance (ICSM 2010), 2010.
Extended European Search Report; Application No. 11185558.1; pp. 7, Sep. 28, 2012.
Extended European Search Report; Application No. 11186160.5; pp. 7, Sep. 28, 2012.
Wolf; "High Performance Embedded Computing. Architectures, applications, and methodologies"; Referex, XP040425711; pp. 520, 2007.
Extended European Search Report; Application No. 11186926.9; pp. 8, Oct. 4, 2012.
Extended European Search Report; Application No. 11186989.7; pp. 8, Oct. 17, 2012.
Extended European Search Report; Application No. 11186993.9; pp. 7, Sep. 28, 2012.
United States Final Office Action, U.S. Appl. No. 12/957,379; pp. 36, Feb. 14, 2013.
Oracle; "Oracle Ultra Search User's Guide 10g"; pp. 272, 2003.
United States Final Office Action, U.S. Appl. No. 12/957,384; pp. 33, Jan. 15, 2013.
United States Office Action, U.S. Appl. No. 12/957,374; pp. 12, Jun. 13, 2013.
United States Office Action, U.S. Appl. No. 12/957,376; pp. 19, Aug. 6, 2013.
Mahapatra; "Scalable Global and Local Hashing Strategies for Duplicate Pruning in Parallel A* Graph Search"; IEEE Transactions on Parallel and Distributed Systems; vol. 8, No. 7; pp. 738-756, 1997.
United States Office Action, U.S. Appl. No. 12/957,379; pp. 30, Sep. 26, 2013.
Sun et al.; "Load Balancing Strategies to Solve Flowshop Scheduling on Parallel Computing"; National Natual Science Foundation of China; (973-Program); pp. 5, 2008.
Chinese Office Action and English translation; Application No. 201080039223.9; pp. 18, Jan. 17, 2014.
United States Office Action, U.S. Appl. No. 13/026,899; pp. 25, Feb. 21, 2014.

* cited by examiner

TECHNIQUE FOR STATELESS DISTRIBUTED PARALLEL CRAWLING OF INTERACTIVE CLIENT-SERVER APPLICATIONS

RELATED APPLICATION

This application claims the benefit under 35 U.S.C. §119 (e) of U.S. Provisional Application Ser. No. 61/408,191 filed Oct. 29, 2010, entitled "METHOD AND SYSTEM FOR PARALLEL CRAWLING OF DYNAMIC WEB APPLICATIONS IN A DISTRIBUTED COMPUTING ENVIRONMENT".

TECHNICAL FIELD

The present invention generally relates to interactive client-server applications and, more particularly, to stateless distributed parallel crawling of interactive client-server applications.

BACKGROUND

Modern Web 2.0 applications employ technologies, such as AJAX and Flash, in order to present a rich, dynamic and interactive interface to the user. However, conventional validation techniques, based on manual testing, are completely inadequate at capturing or exploring the rich, stateful behavior of such web applications. Some recent research has proposed the use of custom AJAX web application crawlers to comprehensively explore, capture and validate the behavior of Dynamic Web 2.0 Applications. However, such crawling is typically very computationally intensive and hence practical considerations limit the actual crawling to only a fraction of the web applications' true behavior-space.

SUMMARY

In one embodiment, a distributed computing system includes a plurality of worker nodes and a master node including a processor coupled to a memory. Each worker node is configured to crawl a portion of an interactive client-server application. The memory includes a master state graph. The master state graph includes the results of at least one of the worker nodes crawling a portion of the interactive client-server application. The master node is configured to examine the master state graph to determine a number of reconverging traces, receive a first result from the execution of a first job from a first worker node if the number of reconverging traces is below a threshold, and add the first result to the master state graph without attempting to remove duplicate states or transitions. A trace includes an alternating sequence of states and transitions representing valid behavior of the interactive client-server application. A reconvergent trace includes a trace including a reconvergent state. A reconvergent state is a state that can be reached through two or more distinct traces of the web application's behavior. The result containing states and transitions is associated with crawling a first portion of the interactive client-server application.

In another embodiment, a method for crawling a interactive client-server application includes examining a master state graph to determine a number of reconverging traces, and, if the number of reconverging traces is below a threshold, crawling a first portion of the interactive client-server application and obtaining results from crawling the first portion of the interactive client-server application and adding the first result to the mater state graph without attempting to remove duplicate states or transitions. The master state graph represents results from partially crawling a interactive client-server application to be crawled. A trace includes an alternating sequence of states and transitions representing valid behavior of the interactive client-server application. A reconvergent trace includes a trace including a reconvergent state. A reconvergent state is a state that can be reached through two or more distinct traces of the web application's behavior. The results contain states and transitions associated with crawling the first portion of the interactive client-server application.

In yet another embodiment, an article of manufacture includes a computer readable medium and computer-executable instructions carried on the computer readable medium. The instructions are readable by a processor. The instructions, when read and executed, cause the processor to examine a master state graph to determine a number of reconverging traces, and, if the number of reconverging traces is below a threshold, crawl a first portion of the interactive client-server application and obtaining results from crawling the first portion of the interactive client-server application and adding the first result to the mater state graph without attempting to remove duplicate states or transitions. The results containing states and transitions associated with crawling the first portion of the interactive client-server application. The master state graph represents results from partially crawling a interactive client-server application to be crawled. A trace includes an alternating sequence of states and transitions representing valid behavior of the interactive client-server application. A reconvergent trace includes a trace including a reconvergent state. A reconvergent state is a state that can be reached through two or more distinct traces of the web application's behavior.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
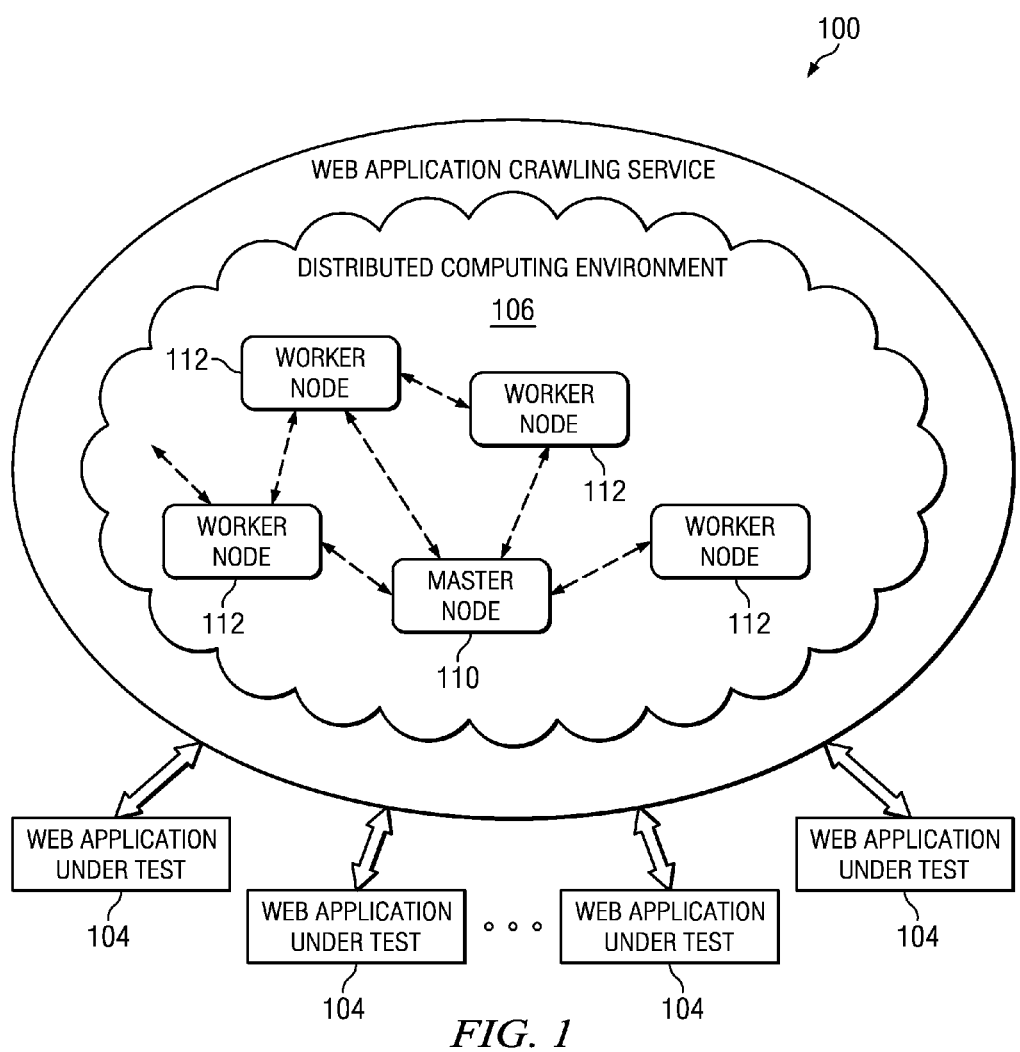
FIG. 1 is an example embodiment of a distributed computing system configured to provide a service for parallel crawling of one or more interactive client-server applications.

FIG. 1 is an example embodiment of a distributed computing system 100. In one embodiment, the distributed computing system 100 may be configured to provide a service for parallel crawling of one or more interactive client-server applications. In one embodiment, such interactive client-server applications may include web applications 104. Such web applications 104 may include dynamic web applications. Web applications 104 may be subsequently tested, once they have been crawled to determine their operation and scope.

The distributed computing system 100 may include any distributed computing environment 106 including multiple, networked computing resources. Such computing resources may be heterogeneous. In various embodiments, the connection topology of the computing resources may be unknown or irregular such that the service being implemented in the distributed computing system 100 cannot take advantage of specific topologies in order to execute the computation task at hand.

In one embodiment, the distributed computing system 100 may be implemented in a cloud computing framework or environment. The distributed computing system 100 may be implemented by one or more computing nodes. One such computing node may be designated as a master node 110, and other computing nodes may be designated as worker nodes 112. The worker nodes 112 and/or master node 110 may be implemented in any suitable electronic device, including but not limited to, a server, computer, or any aggregation thereof. The worker nodes 112 and master node 110 may include a processor coupled to a memory, and instructions, which when loaded in the memory for execution by the processor, may carry out the functionality described herein. The worker nodes 112 and master node 110 may be communicatively coupled to each other, such as through a network arrangement. The network arrangement may be heterogeneous or homogeneous, and may be provided by distributed computing environment 106. Any suitable network arrangement may be used to communicatively couple the worker nodes 112 and master node 110. The worker nodes 112 and master node 110 of the distributed computing system 100 may be networked in any suitable network, such as a wide area network, a local area network, an intranet, the Internet, or any combination of these elements.

The worker nodes 112 and/or master node 110 may be configured to share computational loads associated with a task to be accomplished in a parallel fashion. For example, worker nodes 112 may work in parallel to test the one or more web applications 104. Such web applications may be operating on or hosted by one or more websites. To accomplish such a test, the worker nodes 112 and/or master node 110 may be communicatively coupled to the web applications 104. The master node 110 may be communicatively coupled to the web application 104, and configured to organize the operation of other worker nodes 112 to test the web application 104.

As part of testing the one or more dynamic web applications 104, the worker nodes 112 and master node 110 may operate a web application crawling service. For example, developers of web applications 104 may place such web applications 104 under test, wherein the worker nodes 112 and/or master node 110 of the distributed computing system 100 may crawl such dynamic web applications 104 to determine their scope and operation, which may be used in such tests. Such web applications may include web 2.0 applications using technologies such as AJAX, Flash, or other technologies configured to provide rich, dynamic and interactive user experiences. Such dynamic web applications may have stateful behavior and possibility infinite numbers of dynamically generated screens. Such behavior may be stateful in that a given generated screen or web page may depend, in content or operation, upon the specific actions which brought about the loading, operation, or creation of the screen or web page.

The distributed computing system 100 may include middleware running on each of worker nodes 112 and master node 110. Such middleware may be implemented as software that interfaces the master node 110 with each of worker nodes 112. The middleware may be configured to enable the parallelization of computing tasks. Communication between worker nodes 112 and master node 110 may be very expensive in terms of time or network or processing resources. Thus, the middleware of the distributed computing system 100 may minimize communication between the worker nodes 112 and master node 110.

The computational resources of the distributed computing system 100 may be configured to be leveraged by crawling the dynamic web applications 104. The distributed computing system 100 may be configured to parallelize and distribute the crawlings to multiple computing nodes. Consequently, the crawlings should be made conducive to parallelization. The distributed computing system 100 may be configured to conduct the parallelization of the crawlings in a manner that is independent of topology or architecture. In some embodiments, the nodes of the distributed computing system 100 may have arbitrary connection topology which may be hidden from an application organizing the worker nodes 112 and/or master node 110 for parallel crawling of dynamic applications 104. The distributed computing system 100 may be configured to minimize communication between computing nodes 110, 112, as such nodes may be physically distant from each other, resulting in expensive communication. The worker nodes 112 may be configured to return results of crawling, including states, transitions, and new jobs. The distributed computing system 100 may be configured to re-integrate the results of crawlings from the various worker nodes 112 in the cloud or distributed computing system 100 through the operation of the main computing node 110.

Figure 2:
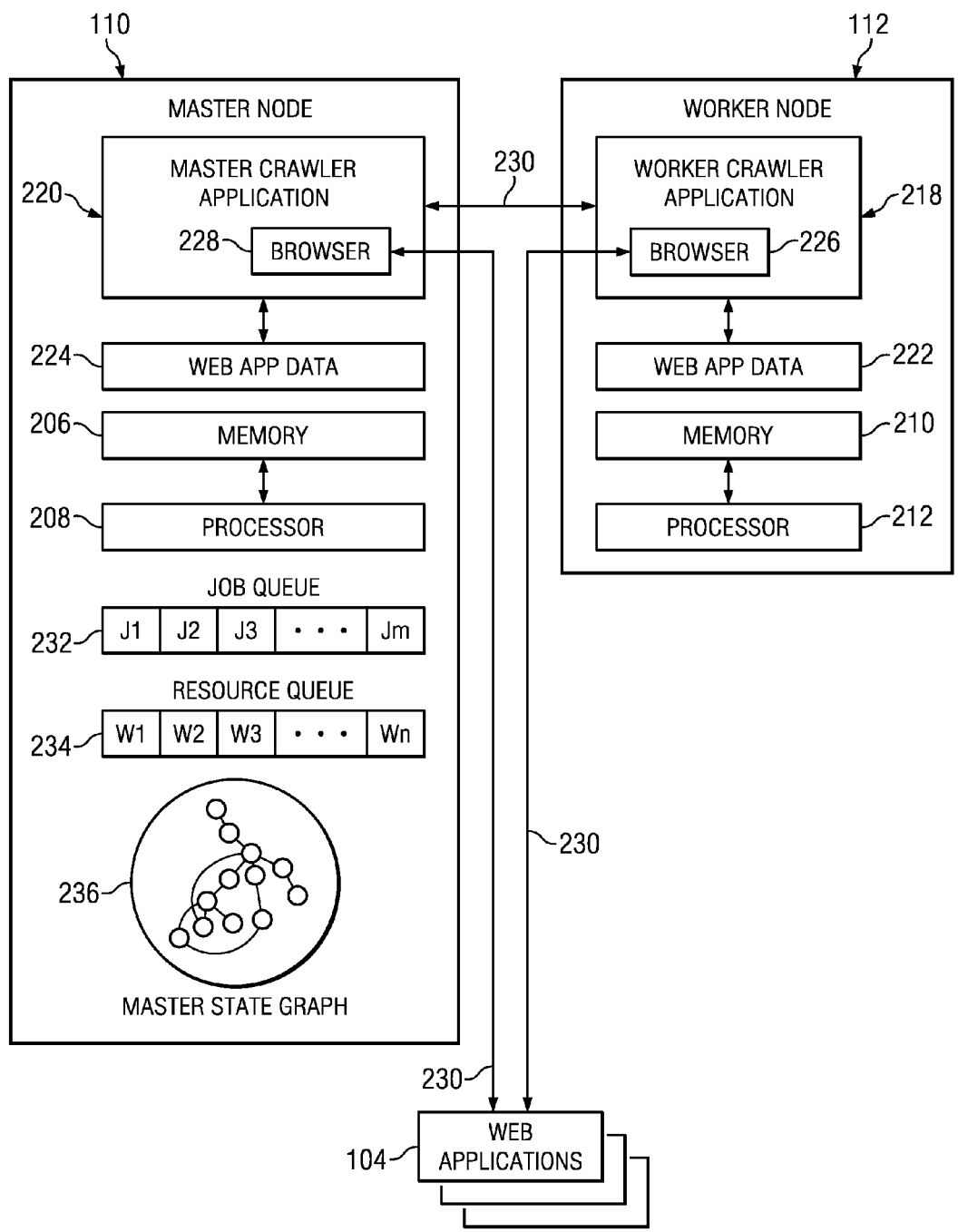
FIG. 2 is an example embodiment of an architecture for distributed, parallel crawling of interactive client-server applications, including a master node and one or more worker nodes.

FIG. 2 is an example embodiment of an architecture for distributed, parallel crawling of interactive client-server applications, including a master node 110 and one or more worker nodes 112. Master node 110 may be communicatively coupled to a worker node 112, and each may be communicatively coupled to one or more web applications 104 to dynamically crawl the web application 104. More worker nodes may be coupled to the master node 110 and the web application 104, but are not shown. Worker node 112 and master node 110 may be communicatively coupled through a network 230. Network 230 may be embodied in the networks or cloud of distributed computing environment 106 of FIG. 1. Worker node 112 may be configured to crawl web application 104 in parallel with other worker nodes, under direction from master node 110.

Master node 110 may include a processor 208 coupled to a memory 206. Master node 110 may include a master crawler application 220. Master crawler application 220 may be configured to be executed by processor 208 and reside in memory 206. Master node 110 may be communicatively coupled to web application 104 and worker node 112 through master crawler application 220.

Master node 110 may include a job queue 232, representing pending jobs which are to be crawled. A job may contain a description of a part of a web application 104 that is to be crawled. Master node 110 may contain a resource queue 234, indicating worker nodes 112 which are available to be assigned crawl job assignments. Examples of the population of resource queue 234 and job queue 232 are discussed below. Crawl jobs may include an indication of a portion of a web application 104 that is to be explored by a worker node 112. The master node 110 may also keep a copy of a master state graph 236, which may be the master copy of a screen transition graph model of the web application 104, and which may contain the result of crawling the web applications 104.

Worker node 112 may include a processor 212 coupled to a memory 210. Worker node 112 may include a worker crawler application 218. Worker crawler application 218 may be configured to be executed by processor 212 and reside in memory 210. Worker node 112 may be communicatively coupled to web applications 104 and master crawler application 220 through worker crawler application 218.

The processors 208, 212 of the nodes may comprise, for example, a microprocessor, microcontroller, digital signal processor (DSP), application specific integrated circuit (ASIC), or any other digital or analog circuitry configured to interpret and/or execute program instructions and/or process data. The processors 208, 212 may interpret and/or execute program instructions and/or process data stored in the respective memories 206, 210 of the worker nodes 112 and/or master node 110. The memories 206, 210 may comprise any system, device, or apparatus configured to retain program instructions and/or data for a period of time (e.g., computer-readable media).

Master node 110 and worker node 112 may be configured to crawl web applications 104. Some or all portions of the web applications 104 may be viewed, executed or analyzed by master node 110 and worker node 112. Each node 218, 220 may contain data 222, 224 pertaining to a portion of the web application 104. Such data 222, 224 may include information enabling communication with or use of the web application 104. For example, data 222, 224 may include document object models, resource information, or web application version. Such an application may include a browser application 226, 228, and may be implemented as part of worker crawler application 218 or master crawler application 220. Brower application 226, 228 may be implemented in any suitable application for loading content from a web application. Browser application 226, 228 may be implemented as a web client. The browser applications 226, 228 may alternatively be configured to work in concert with the crawler applications 218, 220, if the browsers 226, 228 are not implemented in them. In one embodiment, the crawler applications 218, 220 may include FLA-Spider. The crawler applications 218, 220 may be implemented in the Java language. The crawler applications 218, 220 may operate in concert with the browser applications 226, 228. The crawler application 218, 220 may be configured to navigate a web application 104 and programmatically perform various operations such as clicking, mouse over, data entry, or any other operation that may simulate or reproduce the action of a user of a web application 104. The crawler applications 218, 220 may be configured to explore the possible operations of a web application 104, given different user inputs applied to the web application 104.

The crawler applications 218, 220 running on each node may be configured to produce a screen transition graph which may model the behavior of the web application 104 as the web application 104 is crawled, tested, and used. An example screen transition model may be found in FIG. 5, which is discussed in further detail below. In such a screen transition graph, dots or nodes may be used to represent states, where the state denotes screens observed on the browser. Thus, a screen transition graph may be a state graph of an interactive client-server application. Transitions between states may denote various possible user actions. For example, a button click may cause a web application in one state to jump to a different state, wherein the available operations for the web application have changed. Given such a screen transition model, validation checks may be performed subsequently on the model to verify desired operation, or other diagnostic actions.

Crawling information to be used by a crawling application may be provided to each instance of the crawling application, such as worker crawler application 218, so that the distributed computing system 100 may provide parallel crawlings of web applications under test 104. For example, a crawl specification and/or crawl data may be provided to the crawling application 218. The crawl specification may indicate the form of the web application 104, the expected behavior of the web application 104, or any other suitable information about using the web application 104. The crawl data may include actions to be taken by the browser 226, data 222 to be entered, or any other information indicating an action to be taken. For example, for a given page as defined by the crawl specifications, crawl data may indicate that any number of mouse-over's are to be conducted on various specific elements of the web application 104.

Master crawler application 220 may be configured to coordinate the crawling of worker node 112 and other worker nodes 112 in a distributed computing system. Master crawler application 220, in combination with the various instances of worker crawler application 218, may be configured to serve as the middleware of distributed computing system 100 as described above. Master crawler application 220 may be configured to perform some or all of the functions of the master node 110 related to crawling web applications 104. Worker crawler application 218 may be configured to perform some or all of the functions of the worker node 112 related to crawling web applications 104. In various embodiments, the functionality of master crawler application 220 and worker crawler application 218 may be divided differently depending upon the requirements of crawling web applications 104.

Figure 3:
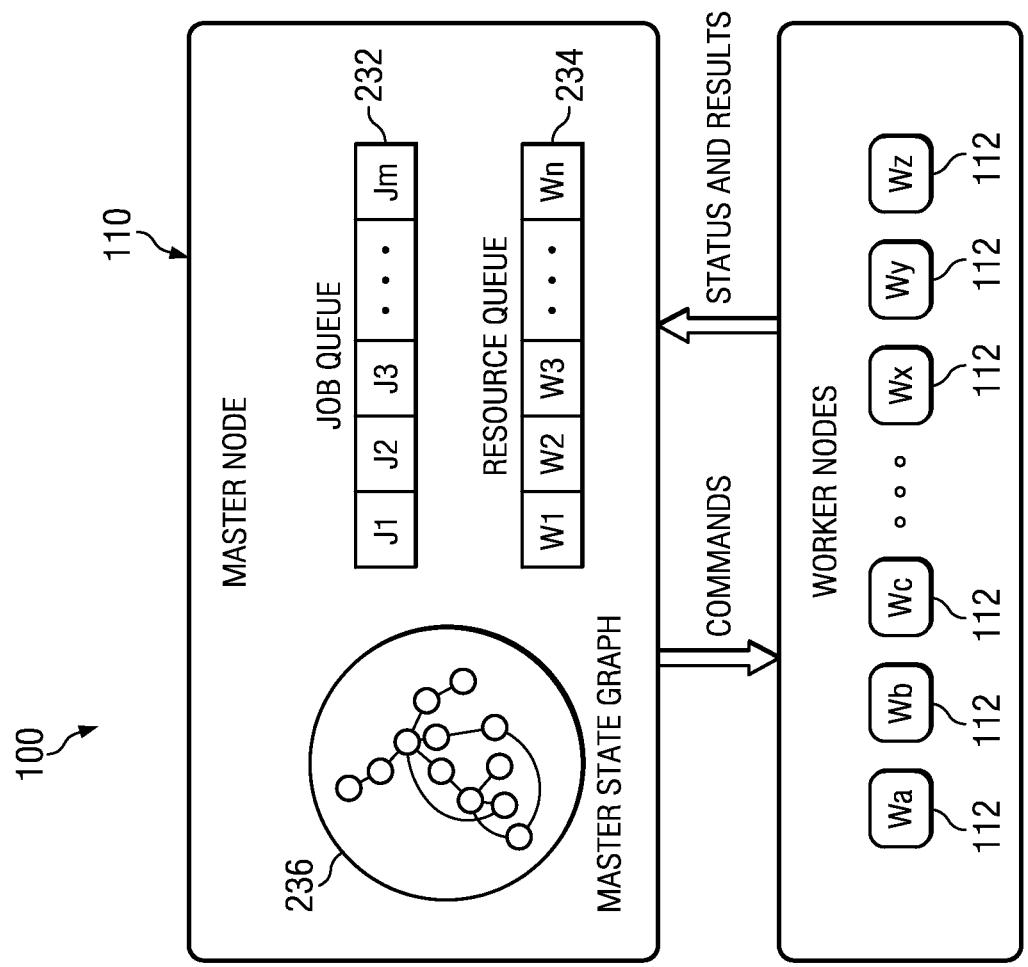
FIG. 3 may illustrate an example embodiment of the operation of an architecture for distributed, parallel crawling of dynamic web applications.

FIG. 3 shows an example of the operation of various nodes within the distributed computing system 100. FIG. 3 may illustrate an example embodiment of the operation of an architecture for distributed, parallel crawling of interactive client-server applications. The distributed computing system 100 may include as many worker nodes 112 as are available for the tasks described herein. The master node 110 may issue commands to worker nodes 112, which in turn may provide status information as well as results to the master node 110.

The master node 110 may issue commands to worker nodes 112, such as crawl job assignments, wherein specific worker nodes 112 from resource queue 234 are assigned specific jobs originating from the job queue 232. Worker nodes 112 may communicate their status as well as crawling results back to the master node 110. Such information may include the completion status of various crawl jobs that have been assigned to the worker nodes 112. This information may also include partial results from such crawl jobs. Such information may also include new crawl jobs which have been discovered by the worker node 112. Worker nodes 112 may be configured to discover new crawl jobs by determining unused actions in states of the web application 104. Such actions may be unused because an alternative action was chosen instead. The new crawl jobs may comprise a starting position for crawling the web application, wherein the crawling may utilize a previously unused action. The master node 110 may be configured to merge the results received from worker nodes 112 into the master state graph 236.

As described above, each worker node 112 may have a copy of some or all of the crawler application as well as crawl configuration information. The worker nodes 112 may perform an assigned crawling task, generate new crawling jobs discovered while crawling, and report back the crawling results and generated jobs to the master node 110. New crawling jobs may include additional portions or options of the dynamic web application 104 to be explored, which are discovered as the worker node 112 conducts crawling activity.

Distributed computing system 100 may be configured to utilize a synchronization scheme for distributed, parallel crawling of dynamic web applications. Such a scheme may enable the synchronization of information regarding the results of crawling a web application 104, such as master state graph 236, between the master node 110 and worker nodes 112. As part of such a scheme, the master node 110 and worker nodes 112 may be configured to reduce communication overhead between such entities for synchronizing information such as the master state graph 236. Worker nodes 112 may be configured to continue to crawl their portions of the dynamic web application independently. Worker nodes 112 may be configured to provide information about the state graph as seen from the perspective of the worker nodes 112 periodically to the master node 110. Such information may include a partial state graph. Each worker node 112 may not have the full master state graph 110 as seen by the master node 110. Instead, each worker node 112 may have a partial state graph reflecting portions of the web application 104 that the worker node 112 was initialized with, in addition to new portions of the web application 104 that the worker node 112 has discovered while crawling the web application 104. Such a partial state graph may include information such as newly discovered states, transitions, or jobs. The partial state graph may contain information discovered since a previous synchronization was conducted. The worker node 112 may select between transmitting partial state graphs and/or newly discovered jobs on a periodic basis, transmitting partial state graphs and/or newly discovered jobs upon completion of a crawling job, or transmitting partial state graphs and/or newly discovered jobs as they are discovered. Such a selection may be made based on operating parameters provided by master node 110. In addition, worker nodes 112 may be configured to compress sets of such states before transmitting them to the master node 110.

The master node 110 may be responsible for purging any duplication of work observed between different worker nodes 112. Such duplication may be observed by the master node 110 comparing the results received from worker nodes 112, wherein such results may include partial state graphs. The master node 110 may be configured to remove duplicate states and traces showing the operation of the web application 104 while merging data received from the various worker nodes 112. The master node 110 may be configured to purge duplicate jobs in the job queue 232 wherein such jobs represent portions of the dynamic web application 104 that have already been crawled. The master node 110 may also be configured to send purge signals to worker nodes 112, wherein the worker nodes 112 are instructed to stop working on jobs that have been determined by the master node 110 as duplicates. Such duplicate jobs may have been assigned already to other worker nodes 112, which are likely presently executing such jobs, or may have already finished. Such purge signals may be based on a record kept by the master node 110 of which jobs have been assigned to which worker nodes 112, as well as an indication of the scope of such a job.

The master node 110 may be configured to schedule jobs from the job queue 232 to worker nodes 112 in the resource queue 234. The master node 110 may be configured to make such scheduling on any suitable basis. In one embodiment, the master node 110 may be configured to schedule jobs from the job queue 232 to worker nodes 112 in the resource queue 234 on a first-in, first-out basis. In another embodiment, the master node 100 may select jobs from the job queue 232, and worker nodes 112 from the resource queue 234, by determining the best match among the jobs or resources. In such an embodiment, matches may be determined on a best-first basis.

Using a best-first basis, the master node 110 may choose the best candidate job to schedule, from the job queue 232, and choose the best resource to schedule it on among the available resources in the resource queue 234. The selection of the best candidate job may be based on any suitable factor. In one embodiment, a time-stamp of the job may be used as a factor in selecting the best candidate job. In such an embodiment, earlier time-stamped jobs may get a higher preference. In another embodiment, the length of the initialization trace for the job may be used as a factor in selecting the best candidate job. In such an embodiment, jobs with smaller initialization traces may have lower initialization costs and may thus be preferred, depending upon the available resources.

The selection of the best candidate resource from the resource queue 234 may be based on any suitable factor. In one embodiment, an insertion time-stamp of the resource may be used as a factor in selecting the best candidate resource. In such an embodiment, earlier time-stamped resources may get a higher preference, so as to maximize the resource's utilization. In another embodiment, computation strength of the resource may be used as a factor in selecting the best candidate resource. In such an embodiment, the computing power of the resource may be used to match it to an appropriately-sized job. In yet another embodiment, communication overhead of the resource may be used as a factor in selecting the best candidate resource. In such an embodiment, if information is known about the connection topology of the resource to the master node 110, the information can be used to give preference to resources with more efficient, shorter, or faster communication with the master node 110. Such information may be determined by the statistical results of worker nodes 112 completing tasks.

To determine either the best candidate resource or the best candidate job, a function, for example, a weighted sum of the factors described above, may be employed to determine the best candidate. Such weighted sums may be used as cost functions for choosing the best candidate. In such a case, if time-stamps of the jobs and the resources are used as the sole criterion for choosing jobs and resources, the scheme begins to become a first-in, first-out mechanism typical of a basic queue data structure.

The master node 110 may be configured to integrate traces and states received from the worker nodes 112 into the master state graph. Worker nodes 112 may provide completed computations representing of a sub-tree or a trace of the behavior of the web application that has been completed and crawled. The master node 110 may also receive indications of new computations as determined by one or more worker nodes 112. Upon reception of traces and states from the worker nodes 112, the master node 110 may be configured to check to determine whether duplicates exist in the received state or traces as compared to information already determined in the master state graph, or as compared to states in jobs that have been assigned to other worker nodes 112. If such duplicates are detected, the master node 110 may be configured to purge duplicate jobs from the job queue 232. The master node 110 may also be configured to purge duplicate crawls currently executing on worker nodes 112 by issuing a purge command. The master node 110 may also be configured to merge the received information with the information in the master state graph, removing duplicates.

Figure 4:
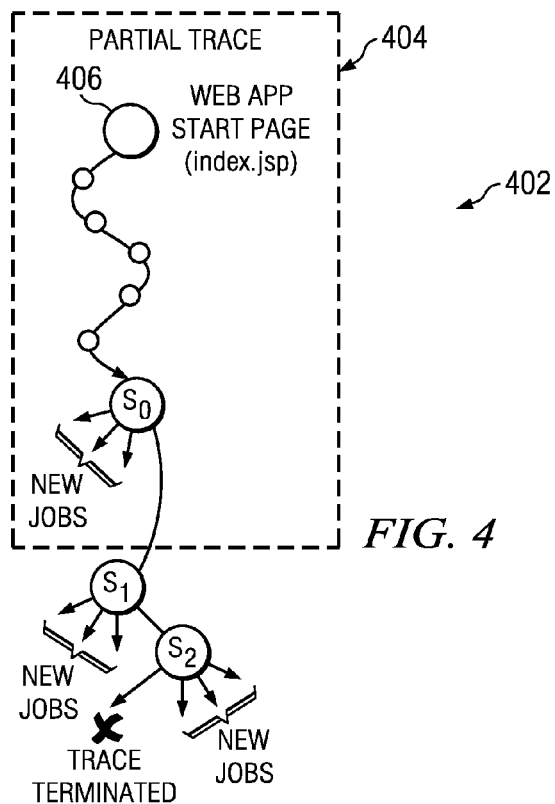
FIG. 4 illustrates the result of the operation of an example worker node through the illustration of a transition graph model.

FIG. 4 illustrates the result of the operation of an example worker node 112 through the illustration of a transition graph model 402. As described above, a worker node 112 may be configured to run a copy of the crawling application. The worker node 112 may also contain appropriate crawling settings for a web application 104 to be tested. The worker node 112 may be configured to initialize its operation with a partial trace 404 provided by the master node 110. Such a partial trace 404 may be an alternative to the worker node 112 initializing its operations with a full copy of the master state graph 236. However, such an initialization with the master state graph 236 may cost more in terms of communication between the worker node 112 and the master node 110. Such an partial trace 404 may include a description of the actions that must be taken from the web application start page 406, such as index.jsp, in order to reach a particular state such as $S_0$ within the master state graph, wherein the particular state is to be crawled by the worker node 112 as part of the job that was assigned to it by the master node 110. The worker node 112 may be configured to continue crawling from $S_0$ and its children states, such as $S_1$, by examining different branches and actions and storing other information as new jobs. The worker node 112 may reach a point in the crawling of the job in which the crawling of the trace will terminate, even though the job has not been completed. Such cases are discussed below.

In another example, if a worker node 112 was given a particular page inside of a dynamic web application to crawl, and was presented with a choice of menu items to be selected on such a page, the worker node 112 may be configured to select the first choice in the menu and explore the subsequent operation of the dynamic web application, and store the states or actions representing the remaining unselected menu choices as future jobs. As the worker node 112 crawls the portions of the dynamic web application to which it was assigned, it may create a local state graph representing the states encountered and the actions taken to reach such states. The worker node 112 may be configured to terminate crawling if it reaches a state which it has seen before. Such a state may include a state which is present in the local state graph. The worker node 112 may be configured to terminate crawling if the crawling hits a depth limit or time limit as set by the crawling specification. For example, along a particular path if a worker node 112 hits a depth of ten subsequent actions, the worker node 112 may terminate its crawling. In addition, the worker node 112 may be configured to terminate crawling if it receives a purge command from the master node 110.

The worker node 112 may be configured to periodically transmit information including information about new states, new traces representing decision paths taken in the web application, and new jobs to the master node 110. The periodic nature of such a transmittal may be set statically or dynamically based on communication and computation tradeoffs as determined by the distributed computing system 100. The specific periodic nature of a given distributed computing system may depend upon the resources of the distributed computing system, the nature of the dynamic web application to be tested, or other unforeseen factors. Specific or optimal values of the periodic nature may be determined experimentally. Upon termination, the worker node 112 may be configured to register itself with the resource queue 234 available in the master node 110.

The distributed computing system 100 may be configured to utilize a technique for stateless distributed parallel crawling of dynamic web applications. In one embodiment, the distributed computing system 100 may be configured to select between conducting stateless parallelization or stateful parallelization of crawling. A stateful parallelization of crawling may include the steps described herein in which states are compared at the master node 110 to search for duplicates among results returned from worker nodes 112, when compared to the master state graph. A stateless parallelization of crawling may cause the master node 110 to not seek to eliminate such duplicates, and the resulting master state graph may not indicate that a state appearing lower in the execution tree is also a duplicate of a higher-appearing state. A stateful parallelization scheme may be more useful when the underlying state graph has significant state sharing, state reconvergence and cycles. The distributed computing system 100 may be configured to use stateless parallelization if little reconvergence exists in the state graph of a given dynamic web application; for example, if the state graph has largely a tree-like structure. When stateless parallelization is employed by the distributed computing system 100, the master and worker nodes 112 may omit state comparisons. Such an omission of state comparisons may speed up the operation of master node 110 as state graph merging may be accomplished with fewer resources. The required purging operations of master node 110 may be eliminated, depending upon the status of stateless parallelization. Similarly, it may speed up the crawling operation at the worker nodes 112. Further, worker nodes 112 may be configured to transmit results only once at the end of computation when using stateless parallelization. However, the resulting master state graph may contain states which appear in multiple positions.

Worker nodes 112 may be configured to compress the state of their operation and of newly discovered jobs through any suitable means. In one embodiment, worker nodes 112 may be configured to use such state compression when successive pages of a dynamic web application represent states which differ only slightly from a previous state. For example, a given user action on a given screen of an AJAX-built web application may result in changes or updates to only a small part of the current screen. Thus, the new screen thus obtained differs in its content, only slightly from the previous screen. Thus, the worker node 112 may be configured to only store the differences between the document object models of successive states of a dynamic web application, which can then be transmitted to the master node 110 and decompressed by the master to obtain the full representation of the respective states. State compression may be enabled when the difference between successive states is lower than a given threshold.

Such a threshold may be set in terms of relative or absolute differences between successive states of the dynamic web application. Worker nodes 112 may be configured to enable and disable state compression depending upon the particular dynamic web application pages that are being crawled presently.

Figure 5:
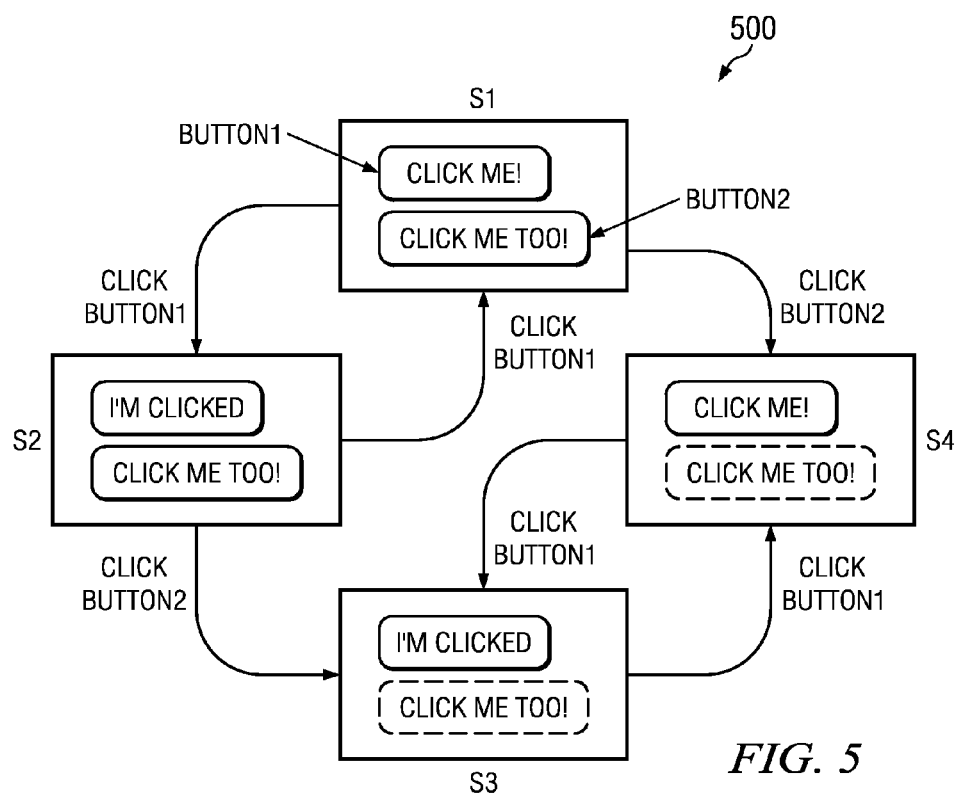
FIG. 5 is a screen transition graph of an example dynamic web application that may be crawled by distributed computing system.

Distributed computing system 100 may be configured to crawl any suitable dynamic web application. FIG. 5 is a screen transition graph of an example dynamic web application 500 that may be crawled by distributed computing system 100. The screen transition graph may contain a state graph. Dynamic web application 500 may be configured to display two buttons, Button1 and Button2. The appearance and functionality associated with an appearance of Button1 and Button2 may depend upon various previous actions from a user. The different states in which the dynamic web application 500 may exist are represented by S1, S2, S3, and S4. The screen transition graph of FIG. 5 may fully represent the possible states of dynamic web application 500. Thus, the screen transition graph of FIG. 5 may be the completed result of dynamically crawling dynamic web application 500.

The code for dynamic web application 500 may be embodied by the following:

```
<!DOCTYPE HTML PUBLIC "-//W3C//DTD HTML 4.0
Transitional//EN">
<html>
<head>
    <script type="text/javascript" >
        function toggle1( ) {
            if(document.getElementById("button1").value ==
            "Click Me !")
                document.getElementById("button1").value = "I'm
clicked";
            else
                document.getElementById("button1").value = "Click
Me !";
        }
        function toggle2( ) {
            document.getElementById("button2").disabled = true;
    }</script>
</head>
<body>
    <input id="button1" style="display:block" class="btn" type="button"
        name="firstButton" onclick="toggle1( );" value="Click Me !" />
    <input id="button2" style="display:block" class="btn" type="button"
        name="secondButton" onclick="toggle2( );" value="Click Me
        Too!" />
</body>
</html>
```

Thus, dynamic web application 500 may be configured to change the appearance of Button1, wherein Button1 may be initially set to display "Click Me!," and upon being clicked, display "I'm clicked." Button1 may be configured to toggle the display between these values upon subsequent clicks. Button2 may be configured to initially display "Click Me Too!," and upon being clicked, become disabled. This may be represented in FIG. 5 as initiating operation in the state represented by S1. If Button1 is clicked, the dynamic web application 500 may transition to the state represented by S2. Once there, if Button1 is clicked again, the dynamic web application 500 may transition back to the S1. If instead Button2 is clicked, the dynamic web application 500 may transition instead to the state represented by S3. Similarly, clicking Button2 from S1 may cause the dynamic web application 500 to transition to the state represented by S4. The dynamic web application 500 may transition between S3 and S4 when Button1 is clicked.

Interactive client-server applications to be crawled by distributed computing system 100 may be configured to operate differently depending upon previous actions that have been taken, which may be represented as different states. In the example of dynamic web application 500, the ability to click Button2 may depend on whether Button2 was previously clicked. Such an action may not be repeatable because no means of transitioning back to the original state exists. States S3 and S4, once entered, may cause the dynamic web application 500 to not be able to return to states S1 and S2. On the other hand, the status of Button1, while also dependent upon the current state, may be toggled. Such a cycle may exist in the actions between S1 and S2, or in the actions between S3 and S4.

In operation, returning to FIG. 3, distributed computing system 100 may utilize a technique for coordinating the distributed, parallel crawling of interactive client-server applications, including dynamic web applications.

The master node 110 may take any suitable actions necessary to coordinate the crawling of a dynamic web application. In one embodiment, the master node 110 may schedule pending jobs to resources waiting to perform such jobs. In another embodiment, the master node 110 may merge results which have been received from worker nodes 112. In such an embodiment, the master node 110 may merge such results with results previously received from other worker nodes 112.

In one embodiment, the tasks of the master node 110 may be implemented using some or all of the following pseudocode:

```
global jobQ, resourceQ, masterSTG
procedure ScheduleJobs( ) {
    while NotEmpty(jobQ) & NotEmpty(resourceQ)
        do
            job ← GetFirst(jobQ)
            worker ← GetFirst(resourceQ)
            ScheduleJob(job, worker)
}
procedure MergeWorkerResults(compTrace, newJobs) {
    comment: Master node will first merge compTrace into the master
        graph
    trace ← UncompressGraph(compTrace)
    for each state in trace)
        do
            if Exists(state; masterSTG) = FALSE
            then Add(state; masterSTG)
    for each transition in trace
        do
            if Exists(transition, masterSTG) = FALSE
            then Add(transition, masterSTG)
    comment: Master node will merge newJobs into existing jobs
    for each job in newJobs
        do
            if Exists(job, jobQ) = FALSE
            then Add(job,jobQ)
}
```

In the above pseudocode, masterSTG may represent the master screen transition graph model of the crawled application. FIG. 5, for example, may represent a completed master screen transition graph of the dynamic web application 500. Such a master screen transition graph may be stored in master state graph 236. JobQ may represent the pending queue of jobs that are to be processed as part of crawling the web application under test. In one embodiment, jobQ may be implemented as a FIFO queue. ResourceQ may represent the pending queue of resources such as worker nodes 112 that are to be assigned jobs. In one embodiment, resourceQ may operate as a first-in first-out queue.

The master node 110 may schedule pending jobs, such as portions of a dynamic web application to be crawled, to waiting resources such as worker nodes 112. As shown above, the master node 110 may, while entries exist in both the JobQ and the resourceQ, get the first job from the top of the job queue 232, get the first resource from the resourceQ, and schedule the job to be conducted by the resource. Any suitable method may be used to get a job from the jobQ or a resource from the resourceQ. In one embodiment, the job and/or the resource that has been pending the longest may be obtained.

The master node 110 may merge worker results returned from worker nodes 112 with traces that have already been created. Each worker node 112 that synchronizes with the master node 110 may send any suitable information to the master node 110. In embodiment, such a worker node 112 may send at least two items of data to the master node 110, a compressed trace (such as compTrace) and a new set of jobs that were encountered (such as newJobs) while the worker node 112 was crawling a portion of a dynamic web application. The master node 110 may merge such information into information being kept at the master node 110 such as jobQ, resourceQ, and the masterSTG. The master node 110 may perform such tasks in any suitable manner.

In parallel with scheduling pending jobs, the master node 110 may merge information received concerning new traces that were encountered by the worker node 112 into the master screen transition diagram. In one embodiment, the master node 110 may uncompress a returned trace that was compressed by a worker node 112. A trace may contain states and transitions between the states. The master node 110 may determine, for each state found in the returned trace, whether such a state exists in the master state diagram. If such a state does not exist, then it is added to the master state diagram. For each transition in the returned trace, the master node 110 may determine if such a transition exists in the master state diagram. If such a transition does not exist, then it is added to the master state diagram. It may be advantageous to first determine the new states, followed by the new transitions.

The master node 110 may merge information concerning new jobs that were encountered or created by the worker node 112 into the job queue 232. The master node 110 may merge such information in any suitable manner. In one embodiment, the master node 110 may determine, for each job in the newJobs that are returned to the master node 110, whether the job already exists in the jobQ. If the job does not exist in the jobQ, then it may be added to jobQ.

Figure 6A:
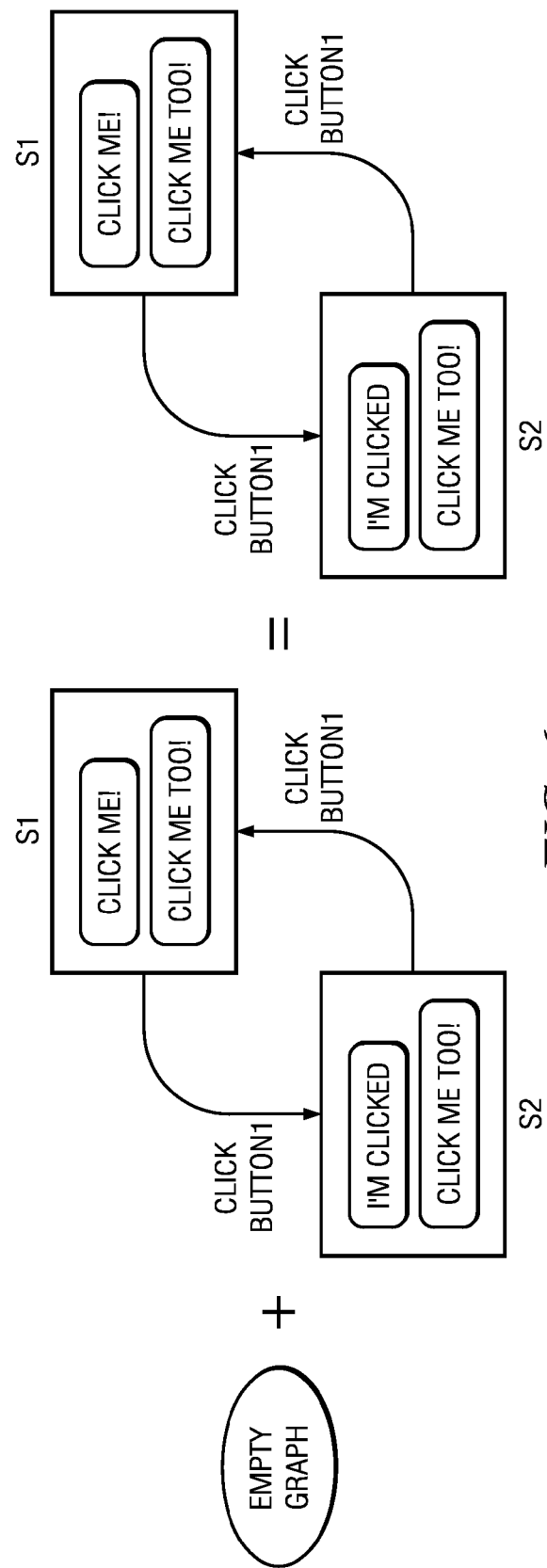
FIG. 6a illustrates how an empty screen transition graph may be combined with a returned trace from a worker node.
Figure 6B:
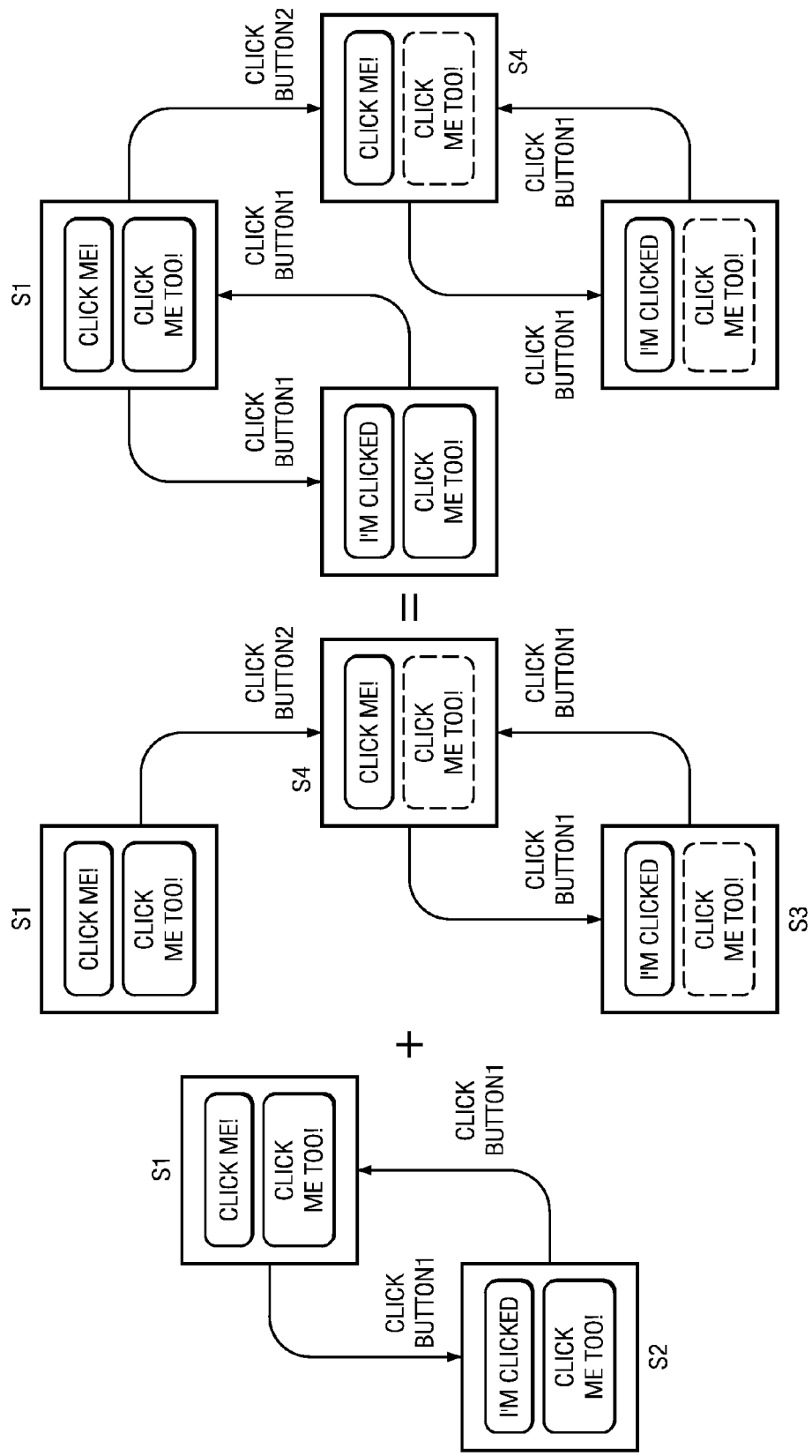
FIG. 6b illustrates how the master node may add the results of another worker node to the existing master screen transition graph resulting from the previous figure.
Figure 6C:
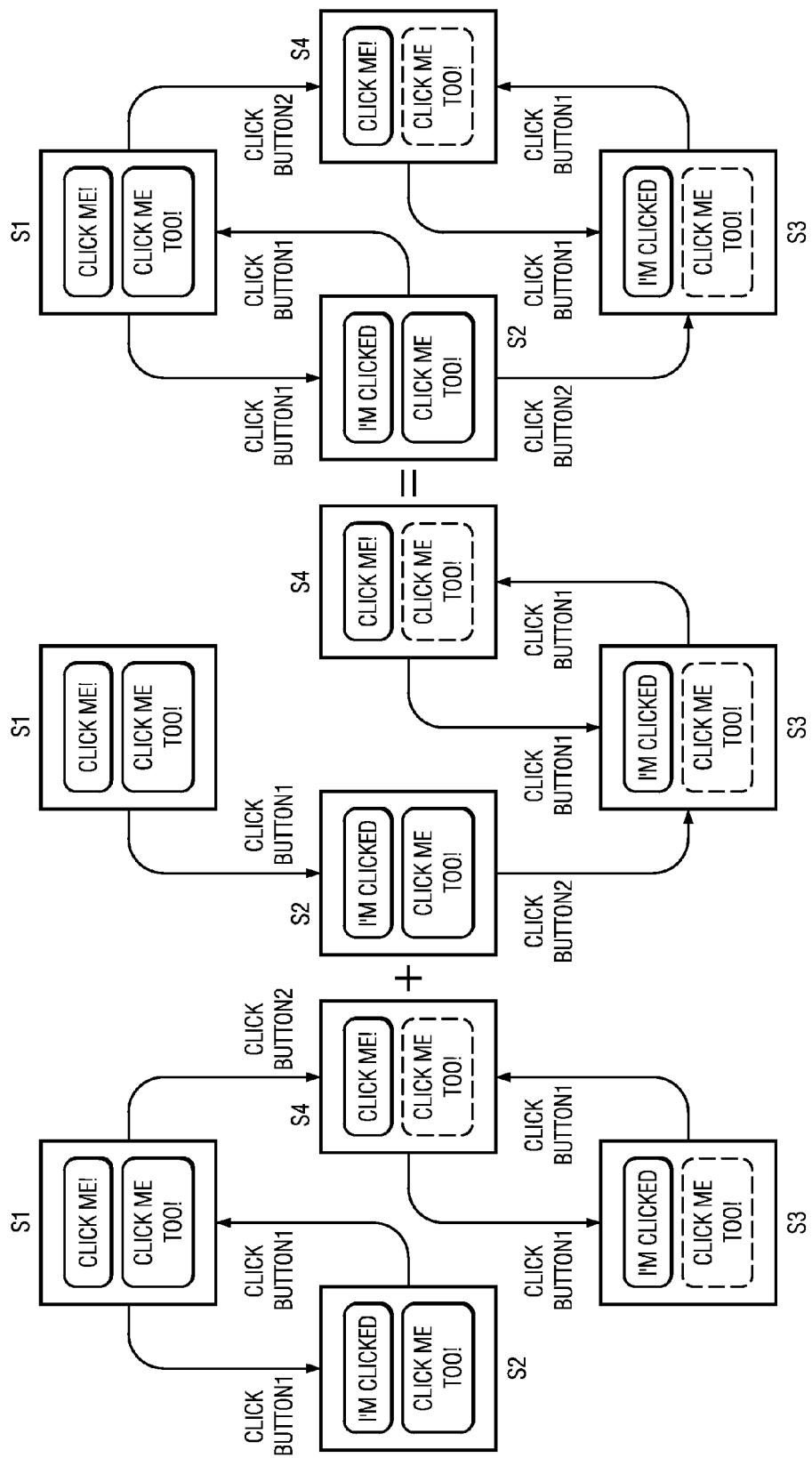
FIG. 6c illustrates how the master node may add the results of yet another worker node to the existing master screen transition graph resulting from the previous figure.

FIGS. 6a-6c illustrate examples of how the master node 110 may add information from the worker nodes 112 to create a master screen transition graph. FIG. 6a illustrates the case wherein an empty screen transition graph may be combined with a returned trace from a worker node 112. In the returned trace, the worker node 112 has crawled from the first state, S1, by clicking Button1 to go to the second state S2, and crawled back to state S1 by clicking Button1 again. Since no states or transitions are already present in the master screen transition graph, the combination results in the returned trace. Options not chosen, such as clicking Button2 in the state S2, may represent future jobs to be completed, which may be returned by the worker node 112 to the master node 110 and added to the job queue 232.

FIG. 6b illustrates how the master node 110 may add the results of another worker node 112 to the existing master screen transition graph resulting from the previous figure. The returned trace in FIG. 6b may be the result of a worker node 112 starting from the first state S1 and then crawling to the state S4 by clicking Button2. The worker node 112 then may have crawled to state S3 by clicking Button1, and crawled back to the state S4 by clicking Button1 a second time. Adding this returned trace to the existing master screen transition graph may cause the master node 110 to pare the returned trace's instance of S1, but otherwise represent the union of the two graphs for both states and transitions. The worker node 112 may have been the same or a different worker node 112 than that which returned a trace in FIG. 6a.

FIG. 6c illustrates how the master node 110 may add the results of yet another worker node 112 to the existing master screen transition graph resulting from the previous figure. The returned trace in FIG. 6c may be the result of a worker node 112 crawling from S1, clicking Button1 to transition to S2, and then clicking Button2 to transition to S3. Once in S3, the worker node 112 may click Button1 to crawl to S4, and click it again to return to S3. Adding this returned trace to the existing master screen transition graph may cause the master node 110 to add the transition from S2 to S3 to the master screen transition graph, as the remaining portions of the returned trace may already exist in the master screen transition graph. The worker node 112 may have been the same or a different worker node 112 than those which returned a trace in FIG. 6a and FIG. 6b. The worker node 112 may have received S2 as a starting state from the master node 110. Such an instruction may have arisen from a previously identified job added to the job queue 232, such as a worker node 112 previously exploring some operations available in S2 but not selecting Button2.

Returning to FIG. 3, distributed computing system 100 may utilize a technique for a technique for efficient partial crawling of an interactive client-server application, such as a dynamic web application, in a parallel, distributed environment. Worker nodes 112 in distributed computing system 100 may crawl portions of a dynamic web application and report the resulting discovered trace to the master node 110. Worker nodes 112 may crawl the dynamic web application in any suitable manner.

In one example, the tasks of the worker node 112 may be implemented using some or all of the following pseudocode:

```
procedure InitializeWorker(config)
    LoadConfig(config)
    return
procedure WorkerCrawlTrace(seedTrace)
    localStateGraph = Null
    newJobs = Null
    currentState ← LoadPage(initScreen)
    currentState ← ExecuteTrace(seedTrace)
    while NotVisited(currentState)&
    WithinResourceBound(localStateGraph)
        do
            if IsReadyToSynchronize(localStateGraph)
                then SyncWithMaster(localStateGraph, newJobs)
            actionList ← ExtractActions(currentState)
            firstAction ← GetFirstAction(actionList)
            actionList ← actionList – firstAction
            currentState ← ExecuteAction(firstAction)
            newJobs ← newJobs U actionList
    SyncWithMaster(localStateGraph, newJobs)
    return
procedure SyncWithMaster(localStateGraph, newJobs)
    deltaTrace ← CompressGraph(localStateGraph)
    SendToMaster(deltaTrace, newJobs)
    MarkSentStates(localStateGraph)
    newJobs = Null
    return
```

The master node 110 may use a function such as LoadConfig(config) to initialize the worker crawler application 218 on a worker node 112 such as w1 according to the configuration config, in order to prepare the worker node 112 for future crawling tasks. In one embodiment, the worker node 112 itself may initialize the worker crawler application 218 on the worker node 112. Config may include any suitable information to initialize the worker node 112. In one embodiment, config may include an address, such as a url, of the dynamic web application to be crawled. In another embodiment, config may include directives for the worker node 112 on how to crawl the dynamic web application. Such directives may include directives on target document object model (DOM) elements; for example, html "<a>" tags. Such directives may also include user actions to execute on the dynamic web page; for example, clicking on specific or categorical items, and/or specific user data to input at appropriate stages during crawling such as authentication data on the login page.

In one embodiment, this initialization process may utilize passing of a set of parameters, such as strings, to a pre-built crawler application previously available on the worker node 112. Such a pre-built crawler application may be implemented in worker crawler application 218. In another embodiment, this initialization process may generate new source code based on the directives in config, which may then be compiled and used to drive the crawler application on w1. Such a crawler application may operate in worker crawler application 218. The generation or compilation of new source code may be carried out on the master node 110, in an application such as master crawler application 220. The generation or compilation of the new source code may be done on the worker node 112.

A worker node 112 may crawl a dynamic web application starting at a designated start position. The designated start position may be implemented in an existing known trace, including states and transitions previously determined. In one embodiment, the worker node 112 may utilize the function procedure WorkerCrawlTrace(seedTrace) as shown above. SeedTrace may be a starting trace passed to the worker node 112 from the master node 110.

Before crawling a dynamic web application, a worker node 112 may create a local state graph, such as localStateGraph and set it as empty. The worker node 112 may create a structure, such as newJobs, for containing new jobs that are discovered while crawling, and set it as empty. The worker node 112 may load the initial screen. The worker node may use a function such as LoadPage(url) as shown above to do so, by loading a starting address such as initScreen into its worker crawler application 218 in preparation for crawling a web application corresponding to the address. In one embodiment, the address is the initial or home page of the web application to be crawled. The results of loading a starting address into the web crawler application may be stored in a structure such as currentState.

The worker node 112 may then programmatically execute a trace to reach the desired state. Such an execution may use the function ExecuteTrace(SeedTrace). ExecuteTrace may in turn call a function such as ExecuteAction(action) to execute a series of actions in SeedTrace. Action may include one or more parameters to direct the immediate operation of the worker node 112 on a specific page. In one embodiment, action may include a pair of parameters {t, u}. t may include a target DOM element, such as a button or a link, on the current page in the browser. u may include a user action, such as a button click or a form data input, to be executed on t. ExecuteAction may programmatically execute the action specified by {t, u} on the current screen or state. In one embodiment, ExecuteAction may be operated assuming that the target element t is available on the current browser screen or state.

Thus, the worker node 112 may make an initial crawl through the dynamic web application as defined by seedTrace, or any other initial trace defined by the master node 110. Such an initial crawl may include repeating steps originally taken by other worker nodes 112. The worker node 112 may assign the results to a structure storing the current state of the crawl, such as currentState.

The worker node 112 may determine whether to continue executing the state graph or not. If so, the worker node 112 will continue to execute actions in the dynamic web application and perform related bookkeeping tasks. Otherwise, the worker node 112 will finalize the crawling of its portion of the dynamic web application and synchronize the state graph and any newly create jobs with the master node 110.

The worker node 112 may determine whether the current state has not been visited, and if the current local state graph is operating within the defined resource bounds. While such criteria are true, the worker node 112 may conduct a sequence of events to crawl a portion of the dynamic web application. To determine whether such criteria are true, a determination about whether a state has been visited before may be made by using the NotVisited(state) function. The worker node 112 may look up a state in the localStateGraph to check if the state exists within it. If the state already exists within the localStateGraph the worker node 112 may determine that the state has been visited before. If the state has been visited before, the NotVisited function may return false, and return true otherwise. Such a determination whether the worker node 112 is operating within the bounds of the application that it has been assigned through any suitable method, such as the function WithinResourceBound(localStateGraph). In such an example, the worker node 112 may determine whether the trace of the localStateGraph is within the resource bounds specified in the config with which the node was initialized, possibly using the function LoadConfig. Such bounds may be defined through any suitable metric. In one embodiment, the number of states in the trace making up the localStateGraph may be compared against a maximum threshold. In another embodiment, the depth to which crawling has been performed in the trace making up the localStateGraph may be compared against a threshold. In yet another embodiment, the time elapsed since the start of the current crawling task may be compared against a maximum threshold. In various embodiments, more than one such criteria may be combined in the resource bounds specified in the config.

Such a sequence may include one or more of the following steps. The worker node 112 may determine whether the local state graph, such as localStateGraph, is ready to be synchronized to the master node 110, and if so, then synchronize the localStateGraph along with any new jobs that have been created, such as those in the structure newJobs. The worker node 112 may make such a determination through any suitable method, such as using the function IsReadyToSynchronize(localStateGraph). In such a case, the worker node 112 may determine whether sufficient crawling has been performed. Such a determination may be made, for example, by measuring the number of crawled states, the depth to which crawling has been performed, or the time elapsed, since the last synchronization event caused by the worker node 112. Use of the function IsReadyToSynchronize may return true if the localStateGraph is ready to be synchronized according to the specified criteria.

From the current state of the dynamic web application, represented by currentState, the worker node 112 may extract the available actions and store them in a structure such as actionList. The worker node 112 may analyze a screen or state of the dynamic web application to determine possible actions to be taken at the screen or state. The worker node 112 may conduct such analysis through any suitable method. In one embodiment, the worker node 112 may conduct such analysis using the function ExtractActions(screen). Typically, the screen or state to be analyzed will be the currentState or the current screen in the browser. The worker node 112 may conduct the analysis based on based on directives specified in the config, with which the crawler was initialized, to extract a list of candidate action elements. The worker node 112 may determine possible actions to be taken and place these within a data structure such as a list.

After determining the possible actions to be taken at the screen, the worker node 112 may extract an action from the list of possible actions. The worker node 112 may use the function GetFirstAction(actionList) to accomplish this task, wherein the actionList is an ordered collection of actions that may be taken at the screen. The worker node 112 may remove the extracted action from the available actions on the current state or screen. The worker node 112 may store the action in a structure such as firstAction. The worker node 112 execute the extracted action, and store the results of the execution in the structure for the current state or screen. The worker node 112 may combine the list of new jobs that have been encountered while crawling, in a structure such as newJobs, with the actions determined from the current state or screen. In one embodiment, the worker node 112 may determine the union of the two sets of jobs, paring any duplicates. The worker node 112 may store the results in the structure for the list of new jobs.

If the crawling is not to continue, then the worker node 112 may synchronize with the master node 110. The worker node 112 may conduct such synchronization at this or any other suitable time. In one embodiment, the worker node 112 may use the function SyncWithMaster(localStateGraph, newJobs) to perform such synchronization. The worker node 112 may perform data transformation, accounting of resources, and send crawling results to the master node 110. Synchronizing with the master node 110 may use information such as the local state graph, and the new jobs which were discovered while crawling.

The worker node 112 may compress the local state graph. The worker node 112 may compress the local state graph through any suitable method. In one embodiment, the worker node 112 may use the CompressGraph(localStateGraph) function. The worker node 112 may use state compression algorithms to represent each state in a state graph. Such compression algorithms may represent the state graph incrementally and reduce the size of the graph. The worker node 112 may produce a compressed state graph as a result of such compression.

The worker node 112 may send information to the master node 110. Such information may include a local state graph—or a compressed or modified version of it—and a list of the new jobs that were encountered during crawling of the dynamic web application. The worker node 112 send such information through any suitable method. In one embodiment, the worker node 112 may use the function SendToMaster(deltaTrace, newJobs) to accomplish such tasks. The worker node 112 may communicate results computed at the current worker node, since the last synchronization event, to the master node 110.

The worker node 112 may then mark portions of the local state graph as synchronized with the master node 110. The worker node 112 may perform such tasks through any suitable method. In one embodiment, the worker node 112 may use the function MarkSentStates(localStateGraph). The worker node 112 may annotate the portion of a graph such as localStateGraph so that it is not retransmitted in future synchronization events. Such markings may be used by functions such as CompressGraph or SendToMaster to determine that certain portions of the state graph do not need to be retransmitted to the master node 110.

When a state has been visited before, or if crawling the local state graph has exceeded the defined resource bounds, the worker node 112 may synchronize with the master node 110. In one embodiment, the worker node 112 may synchronize with the master node 110 using the localStateGraph, representing portions of the graph that have been generated since the last synchronization event on this node, and newJobs, containing a list of pending crawling jobs generated during the crawl and to be potentially executed in future by worker nodes 112 as assigned by the master node 110. The localStateGraph may be compressed and stored into a structure such as deltaTrace. deltaTrace may contain portions of the trace of the dynamic web application that, from the worker node's perspective, may not be contained at the master node 110. The existing local state graph, such as localStateGraph, may be marked as synchronized with the master node 110. The worker node 112 may reset or empty the structure containing new jobs to be synchronized with the master node 110.

Distributed computing system 100 may utilize a technique compression of state information in the crawling of interactive client-server applications, including dynamic web applications. As described above, a worker node 112 may compress a state graph to reduce the information transmitted to a master node 110 during synchronization, and master node 110 may uncompress a state graph to reconstruct newly discovered states.

In one embodiment, the worker node 112 may optimize the state graph by compressing successive states or screens encountered in dynamic web applications that include only minor modifications of the previous screen. In such an embodiment, the two successive screens share much of their underlying DOM. For example, for the screen transition graph of FIG. 6, the underlying DOM representation of the initial state S1 as explained above shows the value assigned to Button1 as "Click Me!" and the value assigned to Button2 as "Click Me Too!." When Button1 is clicked on this screen, causing the transition to state S2, the only change in the underlying DOM is the change of the value attribute of element /HTML[1]/BODY[1]/INPUT[1] from "Click me !" to "I'm clicked". Thus, state S2 may be represented, instead of the full representation, by

```
<html>
<body[1]>
    <input[1] changed="attrs" id="button1" style="display:block"
        class="btn" type="button" name="firstButton"
onclick="toggle1( );" value="I'm clicked" />
</body[1]>
</html>
```

Thus, in one embodiment, the worker node 112 may mark and represent only those portions of a current screen of the dynamic web application (in the above example, S2) where the current screen differs from the previous or reference screen (in the above example, S1). The worker node 112 may mark and represent only those portions of a current screen which differ from the previous screen in any suitable manner. In one embodiment, the worker node 112 may accomplish these tasks through all or part of the following pseudocode:

```
Algorithm - CompressState(refScrn, newScrn)

global refScrn, newScrn
procedure MarkChange(node)
        if Exists(node, refScrn) & NumChild(node) ≥
  NumChild(GetTwin(node, refScrn))
        then
                if¬ AttrsEqual(node, refScrn)
                then
                        node.changed ← "attrs"
                        GetParent(node).childDiff ← true
                        for each child in ChildNodes(node)
                                do MarkChange(child)
                else
                        node.changed ← "tag"
                        GetParent(node).childDiff ← true
                if node.childDiff = true
                        then GetParent(node).childDiff ← true
main
        for each node in newScrn
        do
                node.change ← false
                node.childDiff ← false
        MarkChange(newScrn.root)
        deltaScrn ← ExtractDelta(newScrn, refScrn)
        return (deltaScrn)
```

The worker node 112 may compress the states or screens between a reference screen, such as refScren, and a target screen, such as newScrn. The target screen may be a screen whose compressed representation is required. The reference screen may be any suitable screen. The reference screen may be selected based on similarity to the target screen. Thus, the screen which was visited immediately before visiting the target screen, or another predecessor screen, may likely be chosen. The reference screen may provide the reference with respect to which the compression is performed. The worker node 112 may compress a given state in a state graph primarily in two phases: a marking phase and an extraction phase, discussed below.

The worker node 112 may initialize each node in the target screen, then enter the marking phase, and then enter the extraction phase wherein the results of the marking phase are extracted and returned as the compressed phase.

During initialization, the worker node 112 may compress the state of a newly crawled target screen such as newScrn referencing a reference screen such as refScrn by first initializing all nodes within the target screen. The worker node 112 may set markers denoting a change in the node and denoting change in children nodes to false. The worker node 112 may set two markers to be attached to each node in the DOM of a given screen or the screen in question. The first marker may represent changes made to the current node between the reference and target screens. The first marker may be designated as change. In various embodiments, change may have three different values: "false," "attrs" or "tag." The "false" value may denote that the node is the same in the target and reference screens. Such a denotation may be made in terms of a tag name, attributes, or any other suitable characteristic. The "attrs" value may denote that the node has the same tag name in the target screen as it does in the reference screen, but one or more of the attributes differ in values. The "tag" value may denote that this node has structurally different representations in both screen. For example, such structurally different representations may include nodes with different tags at its position in the two screens, or the case where no node is present at that position in the reference screen, or the case where a node with greater number of children is present at that position in the reference screen. The second marker may represent that one or more of the node's descendents have had their change marker set to a non-false value, and hence the node may need to be present in the compressed representation to provide a path to the descendents, who have experienced a change. The second marker may be designated as childDiff. childDiff may accept a true or false value, wherein the true value indicates that change has happened to a descendant of the node.

Next, in the marking phase, the worker node 112 may compare the target screen to the reference screen, in order to identify what portions of the target screen differ from the reference screen and mark them accordingly. The worker node 112 may accomplish this task through any suitable method. In one embodiment, the worker node 112 may use the function MarkChange to compare the reference screen and the new screen. The worker node 112 may mark the portions of the target screen which have changed in reference to the reference screen. The worker node 112 may begin such markings at the root of the target screen.

In marking the differences between the target screen and the reference screen, the worker node 112 may begin with a starting node, such as node, which may correspond to the root of the target screen. The worker node 112 may determine whether node is different than its equivalent in the reference screen. If so, the worker node 112 may determine that there has been a change between the reference and target screens. The worker node 112 may make such a determination by checking whether node exists in the reference screen, getting the twin of node in the reference screen, and comparing the number of children of node versus the number of children of the twin of node in the reference screen.

In checking whether node exists in the reference screen, the worker node 112 may determine whether a node exists in the target screen with the same xpath position and the same tag name as a particular DOM element, such as node. The worker node 112 may make such a determination through any suitable method. In one embodiment, the worker node 112 may make sure a determination by using the Exists(node, refScrn) function as shown above. The function may return true if and only if there is node in refScrn at the same xpath position and with the same tag name as DOM element node in newScrn.

In getting the twin of node, the worker node 112 may find and return a particular specified node in a reference screen. The worker node 112 may make such a finding through any suitable method. In one embodiment, the worker node 112 may make such a determination by using the GetTwin (node, refScren) function as shown above. The worker node 112 may return the node corresponding to node that exists in refScrn using the xpath correspondence criterion used by Exists( ) above.

In comparing the number of children of node versus the number of children of the twin of node, the worker node 112 may determine a number of children nodes of a given node in the DOM tree of a screen or state. The worker node 112 may make such a determination through any suitable method. In one embodiment, the worker node 112 may make such a determination by using the NumChild(node) function as shown above.

If a twin counter-part of node exists in the reference screen and if it has the same or fewer number of children as node, then the worker node 112 may determine whether the twin of node has exactly the same attributes as node, and if not, change node's and its parent's markers to reflect such a condition by assigning the changed marker of node to be "attrs," and to get the parent of node and change that parent's child-Diff marker to be "true."

In getting the parent of node, the worker node 112 may determine the parent node of a specified node in the DOM tree. The worker node 112 may make such a determination through any suitable method. In one embodiment, the worker node 112 may make such a determination by using the GetParent(node) function as shown above. The function may return the parent node of node in the DOM tree.

If the attributes of the twin node are identical to the node then the worker node 112 may denote that node is unchanged. In addition, if Exists(node, refScrn) & NumChild(node) ≥NumChild(GetTwin(node, refScrn))) returns true, for each child of node, the worker node 112 may recursively process the child using the aforementioned marking scheme. In one embodiment, such a marking may be accomplished by calling MarkChange for each child found for node.

In determining children of node, the worker node 112 may determine the children node of the specified node in the DOM tree. The worker node 112 may make such a determination through any suitable method. In one embodiment, the worker node 112 may make such a determination by using the ChildNodes(node) function as shown above. The function may return an ordered list of children nodes of a specified node such as node in the DOM tree.

Otherwise, if there has been a change between the reference and target screens, with respect to node, possibly by calling Exists(node; refScrn) & NumChild(node)≥NumChild (GetTwin(node; refScrn)) and getting a return value of false), then the worker node 112 may denote that node is changed. In one embodiment, the worker node 112 may make such a designation by setting the changed tag of node to "tag." Further, the worker node 112 may set a tag of the parent of node to indicate that the parent has a child who has changed. this may be accomplished by calling GetParent(node) and setting the result's childDiff parameter to "true."

Finally, the worker node 112 may determine whether node has a child node that has changed, and if so, set a tag of the parent of node to indicate that node's parent has a child who has changed. This may be accomplished by checking the childDiff parameter of node, and then calling GetParent(node) and setting the result's childDiff parameter to "true."

In the extraction phase, the worker node 112 may use the marking of the differences between the target and reference screens to extract a compressed representation of the target screen with reference to the reference screen. The worker node 112 may accomplish this task through any suitable method. In one embodiment, the worker node 112 may use the function ExtractDelta to extract the compressed representation of the target screen. The worker node 112 may extract the differences marked between the target screen and the reference screen, and store the results in a structure such as deltaScrn. The worker node 112 may return the resulting deltaScrn, containing the compressed target screen. Such a target screen may be used as a compressed state to be returned to master node 110.

Figure 7:
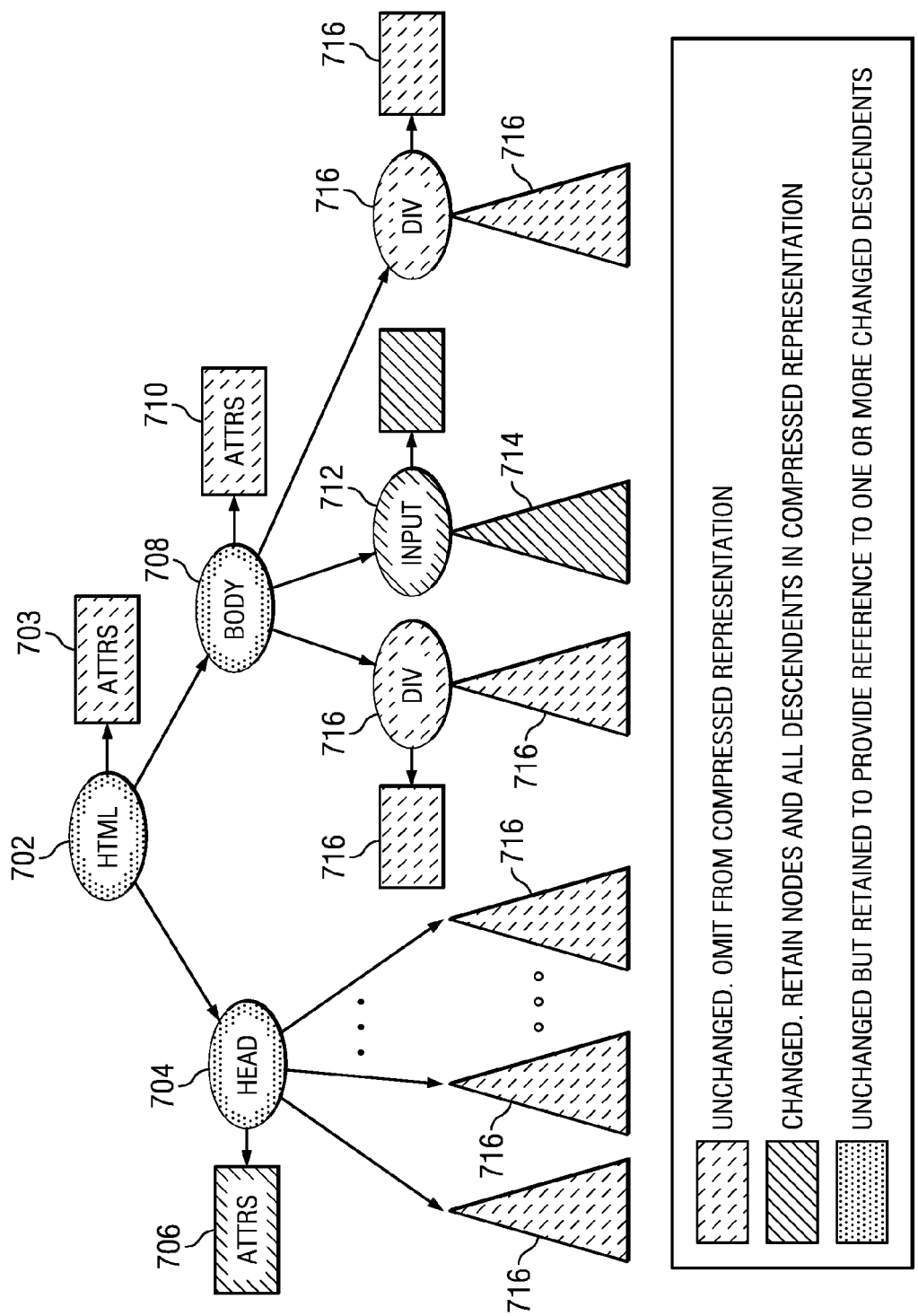
FIG. 7 is an example of a marked version of the document object model tree of a screen of a dynamic web application that has been at least partially crawled.

FIG. 7 is an example of a marked version of the DOM tree of a screen of a dynamic web application that has been at least partially crawled. FIG. 7 may represent the effects of marking target screen such as newScrn in reference to a reference screen such as refScrn. Such a marking may be used by the worker node 112 in the extraction phase to produced a compressed representation such as deltaScrn, by way of the function ExtractDelta. The parts of the marked DOM, retained or discarded show an example of the compressed representation produced. For example, FIG. 7 may represent the compression of the state S2 with respect to state S1, as shown in FIG. 5. In such an example, there may be sections of the DOM tree corresponding to an HTML node 702 of the DOM tree, HTML node attributes 703, a HEAD node 704, HEAD node attributes 706, a BODY node 708, BODY node attributes 710, an INPUT node 712, DOM sub-tree 714 associated with the INPUT node 712, and various other nodes and sub-trees 716. The operation of going from state S1 to S2 may reflect as a change in a DOM node such as INPUT node 712, its attributes, and in the sub-tree of its descendent nodes 714. In addition, there may have been a change exclusively to the attributes 706 of the HEAD node. This may be the result of clicking the "Click Me!" button, wherein portions of the script are activated and changes to the button values are made. These portions of the marked DOM model may be marked as changed, and thus included in a compressed version of the DOM model to be returned. Meanwhile, many other portions 716, 718 of the DOM model may remain unchanged between the two states S1 and S2. Thus, these portions may be marked as unchanged, and thus removed in the compressed version of the DOM model to be returned. Some sections, such as the HTML node 702, HEAD node 704, and BODY node 708 may remain unchanged between the two states S1 and S2, but may have children that did change. Thus, these sections may be retained in the compressed version of the DOM model to be returned so as to provide a path to the portions that did change.

Thus, the worker node 112 may return the portions of FIG. 7 marked as retained as a compressed representation, such as deltaScrn. Such a compressed representation may have sufficient information to uniquely and completely reconstruct the original representation newScrn from deltaScrn and refScrn.

Figure 8A:
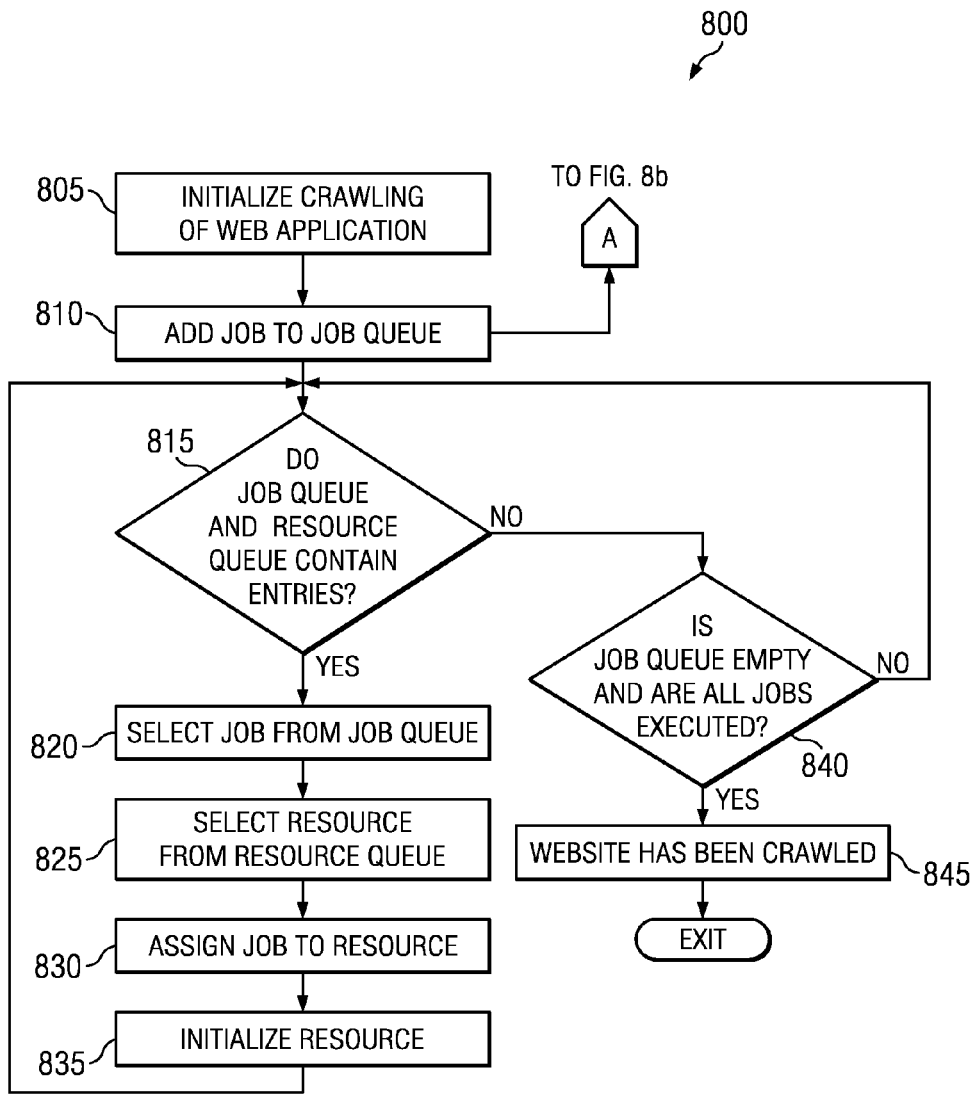
FIGS. 8a and 8b are an example embodiment of a method for coordinating the distributed, parallel crawling of interactive client-server applications such as dynamic web applications.
Figure 8B:
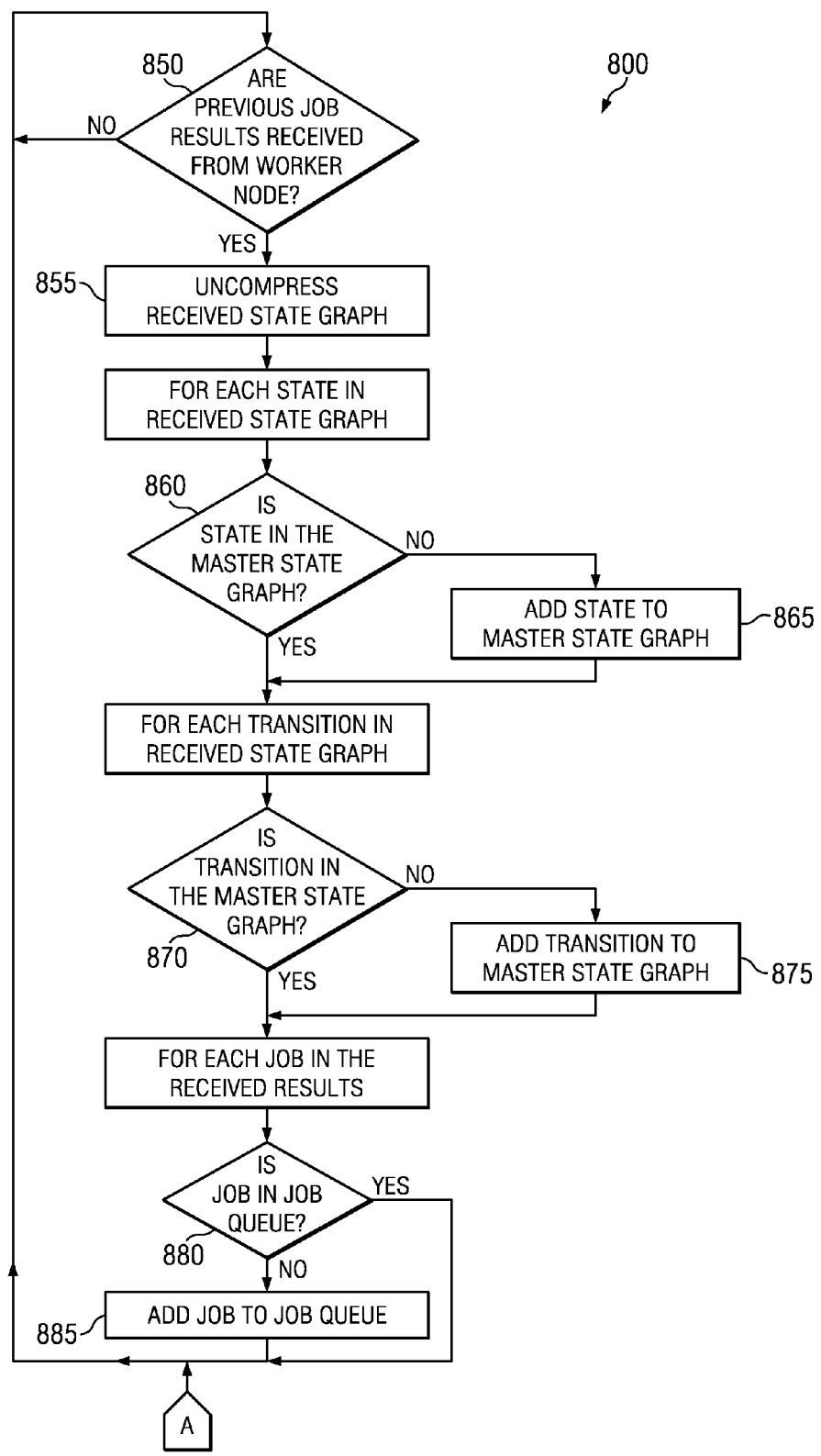

FIGS. 8a and 8b are an example embodiment of a method 800 for coordinating the distributed, parallel crawling of interactive client-server applications such as dynamic web applications. The pseudocode described above in the operation of distributed computing system 100 may implement some or all of method 800.

In step 805, a web application may be initialized for crawling. Such initialization may include determining one or more initial jobs, representing a starting positions or initial traces for crawling the web application. In one embodiment, the number of initial jobs created may be greater than the number of resources available to execute such jobs in parallel. In step 810, any such determined jobs may be added to a job queue.

Two or more branches of method 800 may execute in parallel. One such branch may begin with step 815. Another such branch may begin with step 850. Each branch may execute until the method is terminated. A determination of whether the method should be terminated may happen in either branch, or in another branch of execution of method 800. In one embodiment, such a determination may be made in the branch beginning with step 815.

In step 815, it may be determined whether the job queue and the resource queue contain entries. Step 815 may be implemented in a polling scheme, event handler, or any other suitable mechanism. If the job queue and resource queue contain entries, then in step 820, a job may be selected from the job queue. Any suitable method of selecting a job may be used. In one embodiment, a job may be selected on a first-in first-out basis. In step 825, a resource may be selected from the resource queue. Any suitable method of selecting a resource may be used. In one embodiment, a resource may be selected on a first-in first-out basis. In step 830, the job may be assigned to be executed by the resource. Such an assignment may include the resource crawling a portion of the web application designated by the job. In step 835, the resource may be initialized for execution of the job. Next, the method 800 may return to step 815.

If either the job queue and resource queue do not contain entries, then it may be determined whether the method should be terminated. In step 840, it may be determined whether the job queue is empty and whether all jobs have been executed.

If so, in step 845 such a case may reflect that the web application has been completely crawled, and the method may exit. If not, then the method may return to step 815.

In step 850, it may be determined whether results have been received from any jobs that were previously assigned to resources. Step 850 may be implemented in a polling scheme, event handler, or any other suitable mechanism. If results have not been received, then the method 800 may return to step 850. If results have been received, then in step 855 any state graphs received as part of the results may be uncompressed. For each state in a received state graph, in step 860 it may be determined whether the state is in the master state graph. If not, in step 865 the state may be stored in the master state graph and the method 800 may move to step 870. If so, the method 800 may move to step 870. For each transition in the received state graph, in step 870 it may be determined whether the transition is in the master state graph. If not, in step 875 the transition may be added to the master state graph and the method 800 may move to step 880. If so, the method 800 may move to step 880. For each job in the received results, it may be determined whether the job is in the job queue or currently executing in a resource. If not, then in 885 the job may be added to the job queue and the method 800 may return to step 850. If so, then the method 800 may return to step 850.

Figure 9:
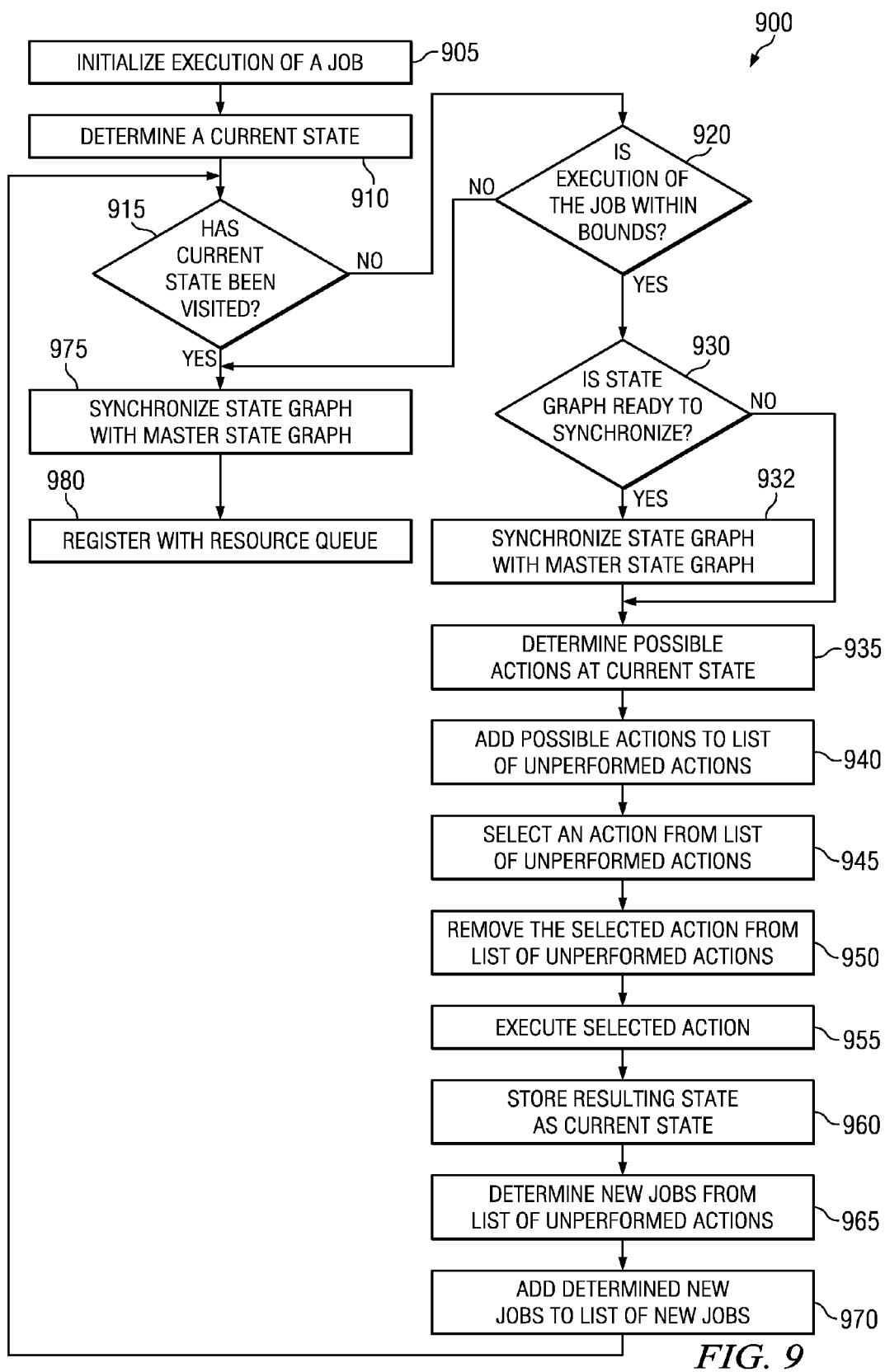
FIG. 9 is an example embodiment of a method for efficient partial crawling of interactive client-server applications such as dynamic web applications in a parallel, distributed environment.

FIG. 9 is an example embodiment of a method 900 for efficient partial crawling of interactive client-server applications such as dynamic web applications in a parallel, distributed environment. The pseudocode described above in the operation of distributed computing system 100 may implement some or all of method 900.

In step 905, the execution of a job may be initialized. The job may represent a portion of a web application to be crawled. Such initialization may include creating an empty state graph, wherein the state graph may contain the results of crawling the web application. A record for containing new jobs discovered while crawling the web application may be initialized. An initial trace may be executed to arrive at a designated starting place in the web application. A screen of the web application at such a designated starting place may be loaded. In step 910, such a screen may be designated as a current state.

In step 915, it may be determined whether the current state has been previously visited, according to the local graph. If so, the crawling of the job may be ended and the method 800 may move to step 975. If not, then in step 920 it may be determined whether execution of the job is within defined bounds. Any suitable method of determining whether execution of the job is within defined bounds may be used. If not, then crawling of the job may be ended and the method 800 may move to step 975. If so, then in step 930 it may be determined whether the state graph is ready to be synchronized. Such a determination may synchronize the state graph on a periodic basis. If so, then in step 932 the state graph may be synchronized with a master state graph, and the method may move to step 935. If not, then the method may move to step 935.

In step 935, crawling of the web application may happen by first determining the possible actions available at the current state. In one embodiment, such actions may be based upon information contained within the DOM of the state. In step 940, the possible actions may be added to a list of unperformed actions. In step 945, an action to be performed may be selected from the list of unperformed actions. Any suitable basis, crawling technique, or search strategy may be used to select which action should be performed. The selected action may be removed from the unperformed action list in step 950, and then executed in step 955. In step 960, the result of executing the step 955 may be designated as the new current state. In step 965, one or more jobs may be created from the list of unperformed actions, and in step 970 the new jobs may be added to a list of new jobs. Such a list of new jobs may be transmitted during synchronization to a job queue for future execution by a resource. The method 800 may then return to step 915.

In step 975, the state graph may be synchronized with the master state graph. This step may be implemented in the same manner as step 932. Other information regarding the execution of the job may be transmitted to a master node. In step 980, a indication of availability of the current worker node 112 may be registered in a resource queue.

Figure 10:
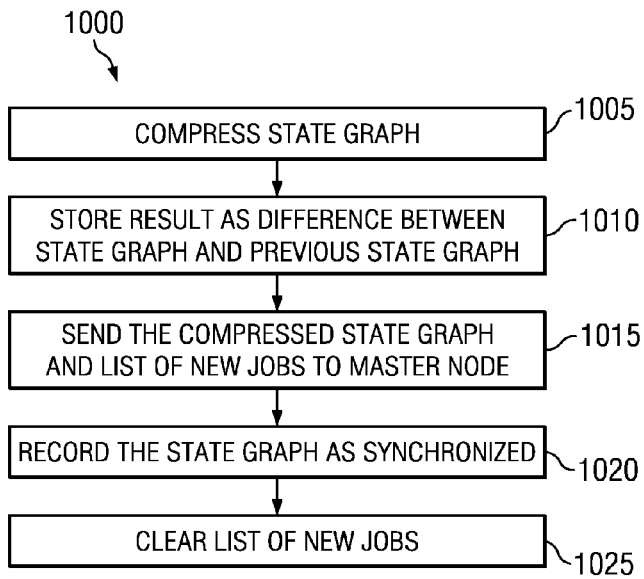
FIG. 10 is an example embodiment of a method for synchronizing a state graph created from crawling a portion of an interactive client-server application with a master state graph of the application.

FIG. 10 is an example embodiment of a method 1000 for synchronizing a state graph created from crawling a portion of an interactive client-server application with a master state graph of the application. In some embodiments, method 1000 may implement some or all of steps 932 and 975 of FIG. 9. The pseudocode described above in the operation of distributed computing system 100 may implement some or all of method 1000.

In step 1005, a state graph to be synchronized with a master state graph may be compressed. Each state within the graph may be compressed using any suitable technique, including those discussed herein. The state graph may contain information from executing a job, the job indicating a portion of a web application to be crawled. In step 1010, the result of such a compression may be stored. The result may represent the difference between the state graph and a previous state graph that was already synchronized. In step 1015, the compressed state graph and/or a list of new jobs may be sent to a master node, which may control the master state graph and may be configured to merge the two. In step 1020, the state graph may be marked as synchronized with the master node. Such markings may be used by a future instance of method 1000 during step 1010. In step 1025, the list of new jobs may be cleared.

Figure 11:
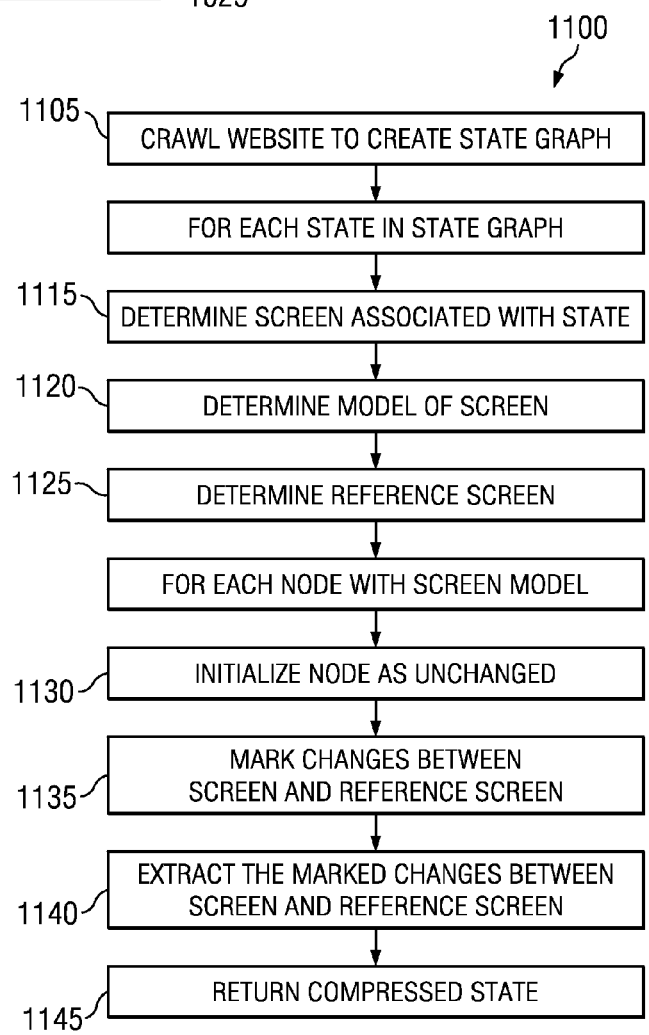
FIG. 11 is an example embodiment of a method for compression of state information in the crawling of interactive client-server applications such as dynamic web applications.

FIG. 11 is an example embodiment of a method 1100 for compression of state information in the crawling of interactive client-server applications such as dynamic web applications. The pseudocode described above in the operation of distributed computing system 100 may implement some or all of method 1100.

In step 1105, an application may be crawled to create a state graph. The state graph may represent the operation of the application. Alternatively, a state graph may be received or other otherwise determined. For each state in the state graph, steps 1115-1145 may be conducted.

In step 1115, a screen associated with the given state may be determined. The following steps may attempt to compress such a screen. In step 1120, a model of the screen may be determined. In one embodiment, such a model may include a DOM model. In step 1125, a reference screen for the screen may be determined. Such a reference screen may include a previous screen, on which an action was taken that led to the given screen.

The given screen may contain one or more nodes as part of its model. For each such node, in step 1130 the node may be initialized. Such initialization may include setting indications that the node is unchanged. Upon finding a change in the node in comparison to the reference screen, such indications may be subsequently changed.

In step 1135, differences between the screen and the reference screen may be marked. Such differences may be marked starting at the root node of the screen.

In step 1140, such marked changes between the screen and the reference screen may be extracted. Such extracted, marked changes may be stored as a compressed version of the given state. In step 1145, the compressed state may be returned.

Figure 12:
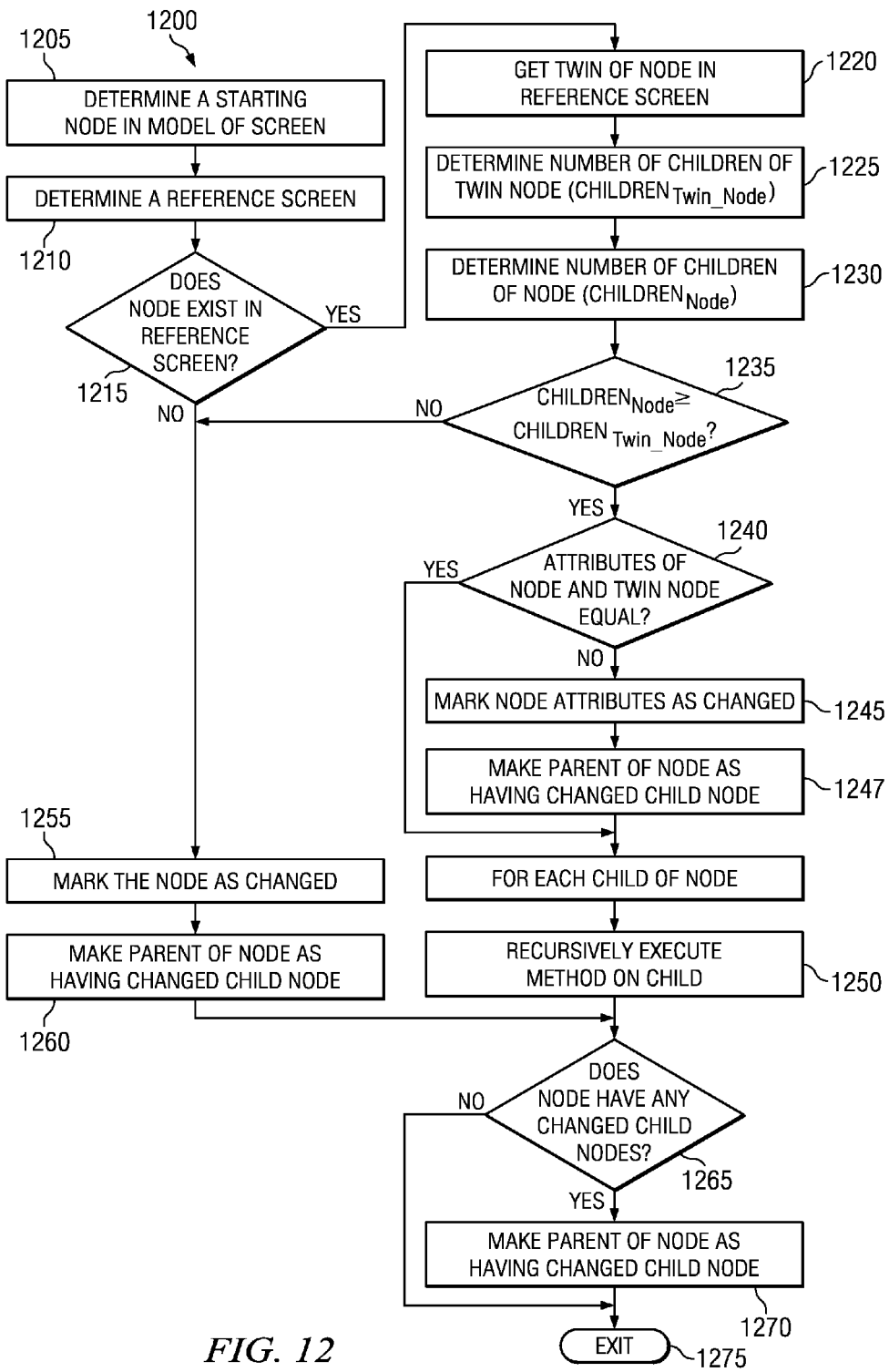
FIG. 12 is an example embodiment of a method for marking the changes between a screen and a reference screen.

FIG. 12 is an example embodiment of a method 1200 for marking the changes between a screen and a reference screen. The pseudocode described above in the operation of distributed computing system 100 may implement some or all of method 1200. In some embodiments, some or all of step 1135 of FIG. 11 may be implemented by method 1200.

In step 1205, a starting node in the model of the screen to be marked may be determined. Such a starting node may be a root node of the screen to be marked, or another node as designated by the entity invoking the method 1200. Similarly, in step 1210 a reference screen may be determined. Such a reference screen may be designated by the entity invoking the method 1200.

In step 1215, it may be determined whether the node exists in the reference screen. If so, then the node's children might be explored to determine any changes between such children and the reference screen. If not, then the node's children might not be explored to determine any changes between such children and the reference screen.

If the node exists in the reference screen, then in step 1220 the twin of the node in the reference screen may be obtained. In step 1225, the number of children of the twin node may be determined, as in step 1230 the number of children of the present node may be determined.

In step 1235 it may be determined whether the present node has an equal or greater number of children than the twin. If so, then in step 1240 it may be determined whether or not the attributes of the node and the twin node are equal. Such attributes may be a part of a DOM model. If the attributes are not equal, then in step 1245 the node may be marked as changed. In one embodiment, indicators concerning the node attributes may be marked as changed. In step 1247, a parent of the node may be determined, and an indicator on such a parent node may be marked to show that the parent has a changed child node. In step 1250, for each child of the present node, the method 1200 may be called recursively. If the attributes of the node and the twin node are equal, then, then the method 1200 may similarly move to step 1250. After the recursive calls to the children nodes have been made, the method 1200 may proceed to step 1265.

If the present node does not have an equal or greater number of children than the twin node, then the method may proceed to step 1255, wherein the node is marked as changed. In step 1260, a parent of the node may be determined, and an indicator on such a parent node may be marked to show that the parent has a changed child node. Step 1260 and step 1247 may be implemented in the same fashion. The method 1200 may then proceed to step 1265.

In step 1265, it may be determined whether the node has any changed child nodes. Such a determination may be made by examining the indications of the node for such a designation. The node may have been marked as such through the recursive call of method 1200 for children of the node, which during the operation of method 1200, may have marked node as having a changed child. If the node has any changed child nodes, then in step 1270 a parent of the node may be determined, and an indicator on such a parent node may be marked to show that the parent has a changed child node. Step 1270, 1260 and step 1247 may be implemented in the same fashion. Method 1200 may then proceed to step 1275, wherein the method 1200 may exit.

Although FIGS. 8-12 disclose a particular number of steps to be taken with respect to example methods 800, 900, 1000, 1100, and 1200, methods 800, 900, 1000, 1100, and 1200 may be executed with more or fewer steps than those depicted in FIGS. 8-12. In addition, although FIG. 8-12 disclose a certain order of steps to be taken with respect to methods 800, 900, 1000, 1100, and 1200, the steps comprising methods 800, 900, 1000, 1100, and 1200 may be completed in any suitable order.

Methods 800, 900, 1000, 1100, and 1200 may be implemented using the system of FIGS. 1-7, or any other system, network, or device operable to implement methods 800, 900, 1000, 1100, and 1200. In certain embodiments, methods 800, 900, 1000, 1100, and 1200 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present disclosure has been described in detail, it should be understood that various changes, substitutions, and alterations can be made hereto without departing from the spirit and the scope of the disclosure.

What is claimed is:

1. A distributed computing system, comprising:
   a plurality of worker nodes, each configured to crawl a portion of an interactive client-server application comprising a dynamic web application; and
   a master node comprising a processor coupled to a memory, the memory comprising a master state graph, the master state graph comprising:
      the results of at least of the worker nodes crawling a portion of the interactive client-server application; and
      a screen transition graph model of the interactive client-server application;
   wherein the master node is configured to:
      examine the master state graph to determine a number of reconverging traces, wherein:
         a trace comprises an alternating sequence of states and transitions representing valid behavior of the interactive client-server application;
         a reconvergent trace comprises a trace comprising a reconvergent state; and
         a reconvergent state is a state that can be reached through two or more distinct traces of the web application's behavior; and
      determine that the number of reconverging traces is below a threshold; and
      based on the determination that the number of reconverging traces is below a threshold:
         receive a first result from the execution of a first job from a first worker node, the result containing states and transitions associated with crawling a first portion of the interactive client-server application; and
         add the first result to the master state graph without attempting to remove duplicate states or transitions.

2. The distributed computing system of claim 1 wherein, based on the determination that the number of reconverging traces is below the threshold, the master node is further configured to omit sending a purge signal to a second worker node, wherein the second worker node is crawling a second portion of the interactive client-server application, wherein the second portion of the interactive client-server application is an equivalent of the first portion of the interactive client-server application.

3. The distributed computing system of claim 1 wherein, based on the determination that the number of reconverging traces is below the threshold, the first worker node is configured to crawl the interactive client-server application, wherein such a crawl comprises continuing crawling without checking if a state reached during the crawl has been previously encountered.

4. The distributed computing system of claim 1 wherein, based on the determination that the number of reconverging traces is below the threshold, the first worker node is configured to send new jobs only upon completion of the first job, the new jobs comprising portions of the interactive client-server application to be crawled, the first worker node identifying the new jobs during crawling of the interactive client-server application.

5. A method for crawling a interactive client-server application, comprising:
   examining a master state graph to determine a number of reconverging traces, the master state graph representing results from partially crawling a interactive client-server application to be crawled and comprising a screen transition graph model of the interactive client-server application, the interactive-client-server application comprising a dynamic web application, wherein
     a trace comprises an alternating sequence of states and transitions representing valid behavior of the interactive client-server application;
     a reconvergent trace comprises a trace comprising a reconvergent state; and
     a reconvergent state is a state that can be reached through two or more distinct traces of the web application's behavior; and
   determining that the number of reconverging traces is below a threshold;
   crawling a first portion of the interactive client-server application; and
   based on the determination that the number of reconverging traces is below a threshold:
     obtaining results from crawling the first portion of the interactive client-server application, the results containing states and transitions associated with crawling the first portion of the interactive client-server application; and
     adding the first result to the mater state graph without attempting to remove duplicate states or transitions.

6. The method of claim 5 further comprising, based on the determination that the number of reconverging traces is below the threshold, omitting purging the crawling of a second portion of the interactive client-server application, wherein the second portion of the interactive client-server application is an equivalent of the first portion of the interactive client-server application.

7. The method of claim 5 further comprising, based on the determination that the number of reconverging traces is below the threshold, crawling the interactive client-server application, wherein such a crawl comprises continuing crawling without checking if a state reached during the crawl has been previously encountered.

8. The method of claim 5 further comprising, based on the determination that the number of reconverging traces is below the threshold, sending new jobs only upon completion of the first job, the new jobs comprising portions of the interactive client-server application to be crawled, the new jobs identified during crawling of the interactive client-server application during the first job.

9. An article of manufacture comprising:
   a non-transitory computer readable medium; and
   computer-executable instructions carried on the non-transitory computer readable medium, the instructions readable by a processor, the instructions, when read and executed, for causing the processor to:
     examine a master state graph to determine a number of reconverging traces, the master state graph representing results from partially crawling a interactive client-server application to be crawled and comprising a screen transition graph model of the interactive client-server application, the interactive-client-server application comprising a dynamic web application, wherein:
       a trace comprises an alternating sequence of states and transitions representing valid behavior of the interactive client-server application;
       a reconvergent trace comprises a trace comprising a reconvergent state; and
       a reconvergent state is a state that can be reached through two or more distinct traces of the web application's behavior; and
     determine that the number of reconverging traces is below a threshold; and
     crawl a first portion of the interactive client-server application; and
     based on the determination that the number of reconverging traces is below a threshold:
       obtain results from crawling the first portion of the interactive client-server application, the results containing states and transitions associated with crawling the first portion of the interactive client-server application; and
       add the first result to the mater state graph without attempting to remove duplicate states or transitions.

10. The article of claim 9 wherein the processor is further caused to, based on the determination that the number of reconverging traces is below the threshold, omit purging the crawling of a second portion of the interactive client-server application, wherein the second portion of the interactive client-server application is an equivalent of the first portion of the interactive client-server application.

11. The article of claim 9 wherein the processor is further caused to, based on the determination that the number of reconverging traces is below the threshold, crawl the interactive client-server application, wherein such a crawl comprises continuing crawling without checking if a state reached during the crawl has been previously encountered.

12. The article of claim 9 wherein the processor is further caused to, based on the determination that the number of reconverging traces is below the threshold, send new jobs only upon completion of the first job, the new jobs comprising portions of the interactive client-server application to be crawled, the new jobs identified during crawling of the interactive client-server application during the first job.

* * * * *